(12) United States Patent
Niinuma

(10) Patent No.: US 8,417,001 B2
(45) Date of Patent: Apr. 9, 2013

(54) BIOMETRIC AUTHENTICATION DEVICE, FAKE BODY JUDGMENT DEVICE, AND BIOMETRIC AUTHENTICATION METHOD WHERE BIOMETRIC INFORMATION VALUE RANGE IS UPDATED WHEN SUBJECT IS LIVING BODY

(75) Inventor: Koichiro Niinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 795 days.

(21) Appl. No.: 12/458,671

(22) Filed: Jul. 20, 2009

(65) Prior Publication Data

US 2010/0061600 A1    Mar. 11, 2010

(30) Foreign Application Priority Data

Sep. 5, 2008    (JP) ................................ 2008-228982

(51) Int. Cl.
*G06K 9/00* (2006.01)
(52) U.S. Cl. ........ 382/124; 382/100; 382/115; 324/658; 324/681
(58) Field of Classification Search ........................ None
See application file for complete search history.

(56) References Cited

U.S. PATENT DOCUMENTS

| 6,665,428 | B1 * | 12/2003 | Gozzini ........................ 382/124 |
| 6,985,887 | B1 * | 1/2006 | Sunstein et al. ................ 705/51 |
| 7,079,007 | B2 * | 7/2006 | Siegel et al. ................ 340/5.52 |
| 7,369,688 | B2 * | 5/2008 | Ser et al. ........................ 382/124 |
| 2004/0086157 | A1 * | 5/2004 | Sukegawa ..................... 382/115 |
| 2005/0053264 | A1 * | 3/2005 | Amano et al. ................ 382/115 |
| 2005/0123177 | A1 | 6/2005 | Abiko |
| 2006/0078177 | A1 * | 4/2006 | Niinuma et al. .............. 382/124 |
| 2006/0115129 | A1 * | 6/2006 | Abe .............................. 382/115 |
| 2006/0210126 | A1 * | 9/2006 | Cho .............................. 382/124 |
| 2007/0150745 | A1 * | 6/2007 | Peirce et al. .................. 713/186 |
| 2007/0215558 | A1 * | 9/2007 | Niinuma et al. .............. 210/767 |
| 2008/0101658 | A1 * | 5/2008 | Ahern et al. .................. 382/115 |

FOREIGN PATENT DOCUMENTS

| CN | 1668245 | 9/2005 |
| CN | 101231692 | 7/2008 |
| EP | 1 291 807 B1 | 1/2007 |
| JP | 2006-016451 | 1/2003 |
| JP | 2005-143804 | 6/2005 |
| JP | 2006-198102 | 8/2006 |
| JP | 2007-244712 | 9/2007 |
| KR | 2003-0017436 | 3/2003 |
| KR | 10-2004-0016005 | 2/2004 |

OTHER PUBLICATIONS

Chinese Office Action for corresponding Chinese Application 200910159092.7; issued Jan. 26, 2011.
Korean Office Action issued Feb. 28, 2011 in corresponding Korean Patent Application 10-2009-71563.

* cited by examiner

*Primary Examiner* — Matthew Bella
*Assistant Examiner* — Jason Heidemann
(74) *Attorney, Agent, or Firm* — Staas & Halsey LLP

(57) ABSTRACT

A biometric authentication device includes a fake body judgment unit that judges whether a subject is a fake body by verifying whether a biometric information value that is input from the subject is within a biometric information value range that has been registered in advance; and a biometric information value range updating unit that, when the fake body judgment unit has judged that the subject is a living body, updates the biometric information value range such that a difference between the biometric information value that is input from the subject and an end of the biometric information value range becomes larger.

18 Claims, 18 Drawing Sheets

FIG.19
Related Art

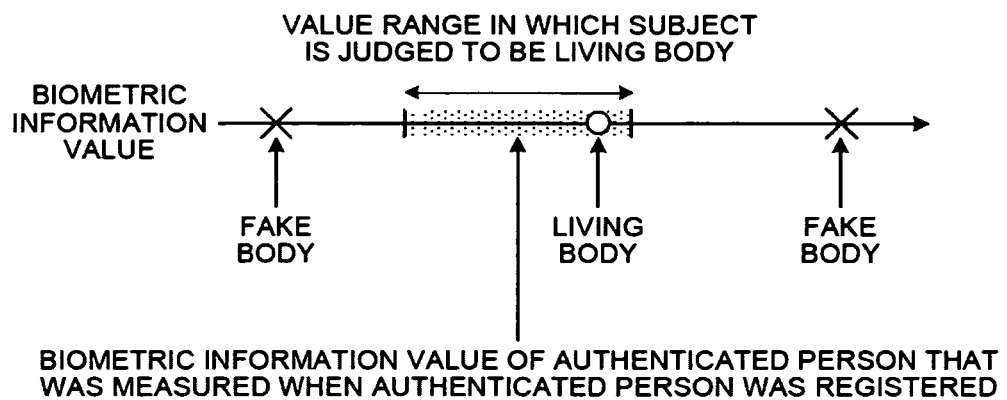

FIG.20
Related Art

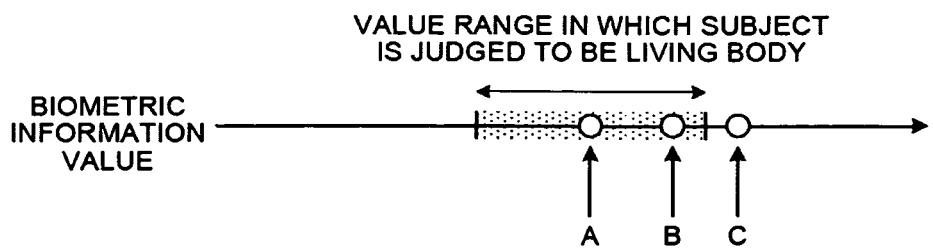

A: BIOMETRIC INFORMATION VALUE OF AUTHENTICATED PERSON
   MEASURED WHEN AUTHENTICATED PERSON WAS REGISTERED

B: BIOMETRIC INFORMATION VALUE OF AUTHENTICATED PERSON
   MEASURED AFTER PREDETERMINED PERIOD HAS ELAPSED SINCE
   AUTHENTICATED PERSON WAS REGISTERED

C: BIOMETRIC INFORMATION VALUE OF AUTHENTICATED PERSON
   MEASURED AFTER PREDETERMINED PERIOD HAS ELAPSED SINCE B

BIOMETRIC AUTHENTICATION DEVICE, FAKE BODY JUDGMENT DEVICE, AND BIOMETRIC AUTHENTICATION METHOD WHERE BIOMETRIC INFORMATION VALUE RANGE IS UPDATED WHEN SUBJECT IS LIVING BODY

CROSS-REFERENCE TO RELATED APPLICATION(S)

This application is based upon and claims the benefit of priority of the prior Japanese Patent Application No. 2008-228982, filed on Sep. 5, 2008, the entire contents of which are incorporated herein by reference.

FIELD

The embodiments discussed herein are directed to a biometric authentication device, a fake body judgment device, and a biometric authentication method for judging whether a subject is a fake body by verifying whether a biometric information value that is input from the subject is within a biometric information value range that has been registered in advance.

BACKGROUND

For the purpose of avoiding situations in which a user who uses a fake body and pretends to be an authenticated person is mistakenly authenticated as the proper authenticated person, a technique for judging whether a subject used in a biometric authentication process is a living body or a fake body is conventionally known (see, for example Japanese Laid-open Patent Publication No. 2007-244712).

More specifically, as depicted in FIG. 19, when an authenticated person is registered, a biometric information value of the authenticated person is measured, and a biometric information value range is specified so that a subject exhibiting a value that deviates from the measured biometric information value by an amount equal to or smaller than a predetermined amount is judged to be a living body. With this arrangement, when the biometric information value of a subject is within the biometric information value range, the subject is judged to be a living body.

The conventional technique described above, however, has a problem where, if the biometric information value of the authenticated person has fluctuated, even if an authentication process is performed on the authenticated person himself/herself, he/she may be judged to be a fake body. For example, according to the conventional technique described above, as depicted in FIG. 20, if the biometric information value of an authenticated person has gradually increased over the course of time and has become larger than the upper limit value of the biometric information value range used in the judgment process for fake body, a problem arises where, even if a biometric authentication process is performed on the authenticated person himself/herself, he/she will be judged to be a fake body.

SUMMARY

According to an aspect of the invention, a biometric authentication device includes a fake body judgment unit that judges whether a subject is a fake body by verifying whether a biometric information value that is input from the subject is within a biometric information value range that has been registered in advance; and a biometric information value range updating unit that, when the fake body judgment unit has judged that the subject is a living body, updates the biometric information value range such that a difference between the biometric information value that is input from the subject and an end of the biometric information value range becomes larger.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 19 is a drawing for explaining a conventional technique; and

FIG. 20 is another drawing for explaining the conventional technique.

DESCRIPTION OF EMBODIMENT(S)

Preferred embodiments of a biometric authentication device, a fake body judgment device, a biometric authentication method, and a biometric authentication computer program according to the present invention will be explained in detail, with reference to the accompanying drawings. In the following sections, fingerprint authentication devices to which the present invention is applied will be explained as the exemplary embodiments.

[a]First Embodiment

In the description of a first embodiment of the present invention below, an outline of a fingerprint authentication device according to the first embodiment, a configuration of the fingerprint authentication device, a flow in the processes performed by the fingerprint authentication device, and an advantageous effect of the first embodiment will be explained.

<Outline of Fingerprint Authentication Device According to First Embodiment>

Figure 1:
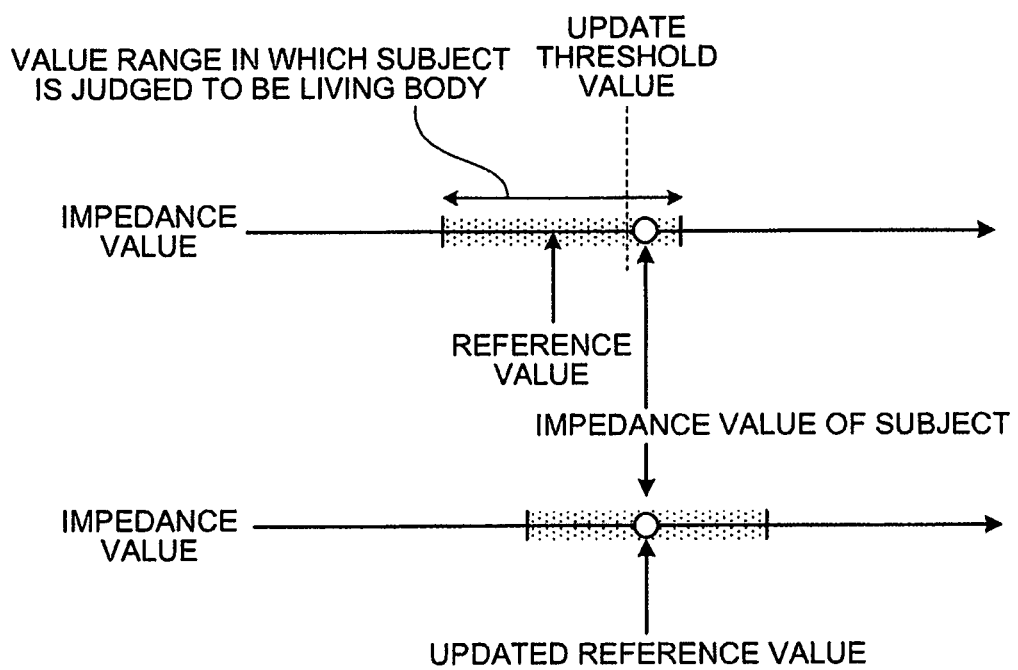
FIG. 1 is a drawing for explaining an outline of a fingerprint authentication device according to a first embodiment of the present invention.

First, the outline of the fingerprint authentication device according to the first embodiment will be explained, with reference to FIG. 1. FIG. 1 is a drawing for explaining the outline of the fingerprint authentication device according to the first embodiment.

The outline of the fingerprint authentication device according to the first embodiment is summarized as follows: The fingerprint authentication device judges whether a subject is a fake body by verifying whether a biometric information value that is input from the subject is within a biometric information value range that has been registered in advance. In particular, the fingerprint authentication device according to the first embodiment prevents misjudgments in a fake body judgment process that are caused by fluctuations in the biometric information value of an authenticated person.

More specifically, when an impedance value that is input from the subject is within the biometric information value range in which the subject is determined to be a living body, the fingerprint authentication device updates the biometric information value range such that a difference between the impedance value that is input from the subject and an end of the biometric information value range becomes larger. For example, as depicted in FIG. 1, when the difference value between the impedance value of the subject and the center value (hereinafter, a "reference value") of the biometric information value range is larger than an update threshold value that is specified as a condition for updating the biometric information value range, the fingerprint authentication device updates the biometric information value range such that the impedance value of the subject is the updated reference value.

With this arrangement, the fingerprint authentication device according to the first embodiment is able to prevent misjudgments in the fake body judgment process that are caused by fluctuations in the impedance value of an authenticated person.

<Configuration of Fingerprint Authentication Device>

Figure 2:
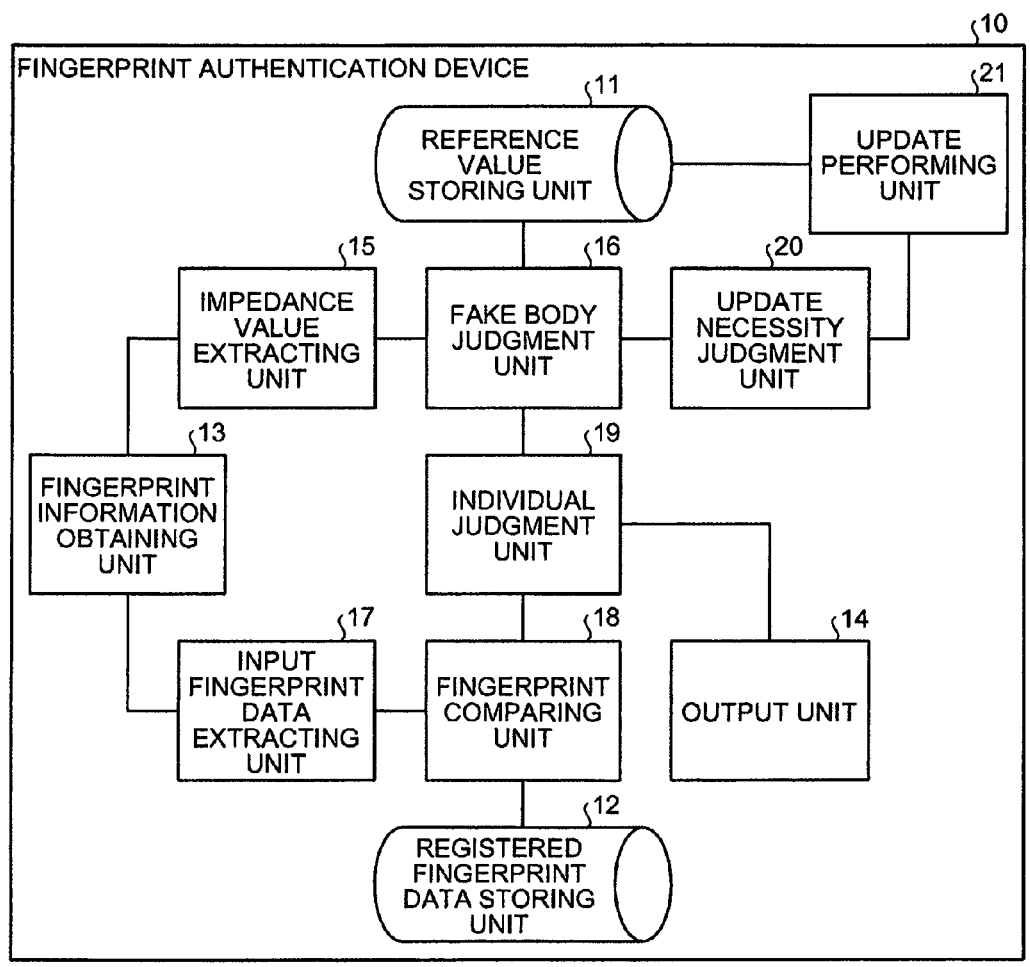
FIG. 2 is a block diagram of the fingerprint authentication device.

Next, a configuration of the fingerprint authentication device explained with reference to FIG. 1 will be explained, with reference to FIG. 2. FIG. 2 is a block diagram of the fingerprint authentication device.

As depicted in FIG. 2, a fingerprint authentication device 10 includes a reference value storing unit 11, a registered fingerprint data storing unit 12, a fingerprint information obtaining unit 13, an output unit 14, an impedance value extracting unit 15, a fake body judgment unit 16, an input fingerprint data extracting unit 17, a fingerprint comparing unit 18, an individual judgment unit 19, an update necessity judgment unit 20, and an update performing unit 21. The update necessity judgment unit 20 and the update performing unit 21 may also be referred to as a biometric information value range updating unit.

The reference value storing unit 11 stores therein a reference value used for specifying a biometric information value range. More specifically, the reference value storing unit 11 stores therein an impedance value used as the reference value associated with an authenticated person's identifier (ID) that is uniquely assigned to an authenticated person. The reference value that is initially stored in the reference value storing unit 11 is an impedance value from a finger of the authenticated person that was measured when the authenticated person performed a fingerprint registration process. The biometric information value range is a value range specified such that the reference value is the center value thereof.

The registered fingerprint data storing unit 12 stores therein a comparison-purpose fingerprint image. More specifically, the registered fingerprint data storing unit 12 stores therein the authenticated person's ID and the fingerprint image of the authenticated person while being associated with each another.

The fingerprint information obtaining unit 13 obtains various types of information that are related to a fingerprint authentication process. More specifically, the fingerprint information obtaining unit 13 corresponds to a fingerprint sensor. When having received an operation for inputting the authenticated person's ID and the fingerprint image, the fingerprint information obtaining unit 13 captures an image of the subject so as to obtain the fingerprint image of the subject and measures the impedance value of the subject.

The output unit 14 outputs various types of information that are related to the fingerprint authentication process. For example, the output unit 14 outputs and displays an authentication result of the fingerprint authentication process and outputs the authentication result of the fingerprint authentication process to a function unit that performs a process (e.g., locks or unlocks a lock) according to the authentication result.

The impedance value extracting unit 15 extracts the authenticated person's ID and the measurement result of the impedance value of the subject, out of the various types of information that have been obtained by the fingerprint information obtaining unit 13 and transmits the extracted information to the fake body judgment unit 16 as input data.

The fake body judgment unit 16 judges whether the subject is a fake body or a living body by verifying whether the biometric information value that is input from the subject is within the biometric information value range that has been registered in advance. More specifically, when having received the input data from the impedance value extracting unit 15, the fake body judgment unit 16 reads the reference value that corresponds to the authenticated person's ID stored in the input data out of the reference value storing unit 11, as registered data. After that, the fake body judgment unit 16 compares the impedance value of the subject with the reference value.

In this situation, when the difference value between the impedance value of the subject and the reference value is equal to or smaller than a real/fake judgment threshold value that is specified as a condition used for judging whether the subject is a fake body or a living body, the fake body judgment unit 16 judges that the subject is a living body. Subsequently, the fake body judgment unit 16 transmits, to the individual judgment unit 19, a judgment result indicating that the subject is a living body. On the contrary, when the difference value between the impedance value of the subject and the reference value is larger than the real/fake judgment threshold value, the fake body judgment unit 16 judges that the subject is a fake body. After that, the fake body judgment unit 16 transmits, to the individual judgment unit 19, a judgment result indicating that the subject is a fake body.

When the fake body judgment unit 16 has obtained the judgment result indicating that the subject is a living body, the input fingerprint data extracting unit 17 extracts the authenticated person's ID and the fingerprint image of the subject out of the various types of information that have been obtained by the fingerprint information obtaining unit 13 and transmits the extracted information to the fake body judgment unit 16 as input data.

The fingerprint comparing unit 18 judges whether the subject is the authenticated person himself/herself, based on a comparison result obtained by comparing personal identification information of the subject with comparison-purpose personal identification information stored in a storage unit in advance. More specifically, when the fingerprint comparing unit 18 has received the input data from the input fingerprint data extracting unit 17, the fingerprint comparing unit 18 reads the fingerprint image of the authenticated person corresponding to the authenticated person's ID contained in the input data, out of the registered fingerprint data storing unit 12, as registered data. After that, the fingerprint comparing unit 18 compares the fingerprint image of the subject with the fingerprint image of the authenticated person.

In this situation, when a comparison score indicating a matching degree between the fingerprint image of the subject and the fingerprint image of the authenticated person is larger than a success/failure judgment threshold value that is specified as a condition used for judging whether a fingerprint authentication process is successfully performed, the comparison score, the fingerprint comparing unit 18 judges that the fingerprint authentication process has successfully been performed. After that, the fingerprint comparing unit 18 transmits, to the individual judgment unit 19, a judgment result indicating that the subject is the authenticated person himself/herself. On the contrary, when the comparison score is equal to or smaller than the success/failure judgment threshold value, the fingerprint comparing unit 18 judges that the fingerprint authentication process has failed. After that, the fingerprint comparing unit 18 transmits, to the individual judgment unit 19, a judgment result indicating that the subject is a person different from the authenticated person (i.e., a wrong person).

When the individual judgment unit 19 has received the judgment result indicating that the subject is a living body from the fake body judgment unit 16 and has further received the judgment result indicating that the subject is the authenticated person himself/herself from the fingerprint comparing unit 18, the individual judgment unit 19 outputs an authentication result indicating that the authentication process has successfully been performed, via the output unit 14. On the contrary, when the individual judgment unit 19 has received the judgment result indicating that the subject is a living body from the fake body judgment unit 16 and has further received the judgment result indicating that the subject is a person different from the authenticated person from the fingerprint comparing unit 18, the individual judgment unit 19 outputs an authentication result indicating that the authentication process has failed, via the output unit 14. Alternatively, when the individual judgment unit 19 has received a judgment result indicating that the subject is a fake body from the fake body judgment unit 16, the individual judgment unit 19 outputs an authentication result indicating that the authentication process has failed, via the output unit 14.

The update necessity judgment unit 20 judges whether the biometric information value range should be updated. More specifically, when the individual judgment unit 19 has obtained the authentication result indicating that the authentication process has successfully been performed, the update necessity judgment unit 20 calculates the difference value between the impedance value of the subject and the reference value and compares the calculated difference value with the update threshold value that is specified as a condition for updating the reference value.

In this situation, when the difference value is larger than the update threshold value, the update necessity judgment unit 20 judges that the reference value should be updated. On the contrary, when the difference value is equal to or smaller than the update threshold value, the update necessity judgment unit 20 judges that the reference value should not be updated.

The update performing unit 21 updates the biometric information value range such that the difference between the biometric information value that is input from the subject and an end of the biometric information value range becomes larger. More specifically, when the update necessity judgment unit 20 has obtained the judgment result indicating that the reference value should be updated, the update performing unit 21 updates the reference value stored in the reference value storing unit 11 such that the updated reference value is set to be equal to the impedance value of the subject. In other words, the update performing unit 21 updates the reference value such that the updated reference value is set to be equal to the impedance value of the subject, and also updates the biometric information value range such that the impedance value of the subject is a center value of the updated biometric information value range. On the contrary, when the update necessity judgment unit 20 has obtained the judgment result indicating that the reference value should not be updated, the update performing unit 21 ends the process without taking any further procedure.

<Processes Performed by Fingerprint Authentication Device>

Figure 3:
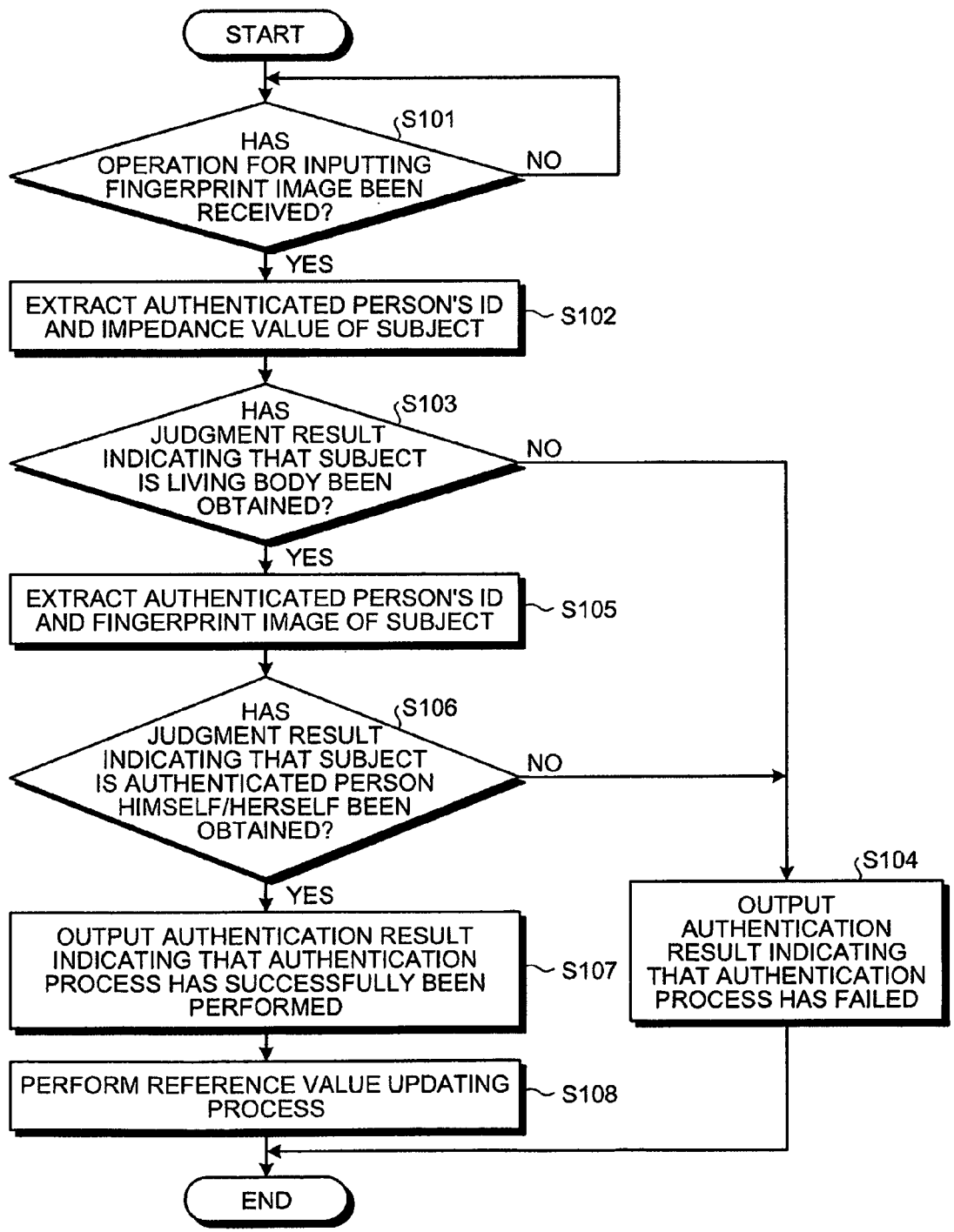
FIG. 3 is a flowchart for explaining a flow in processes performed by the fingerprint authentication device.
Figure 4:
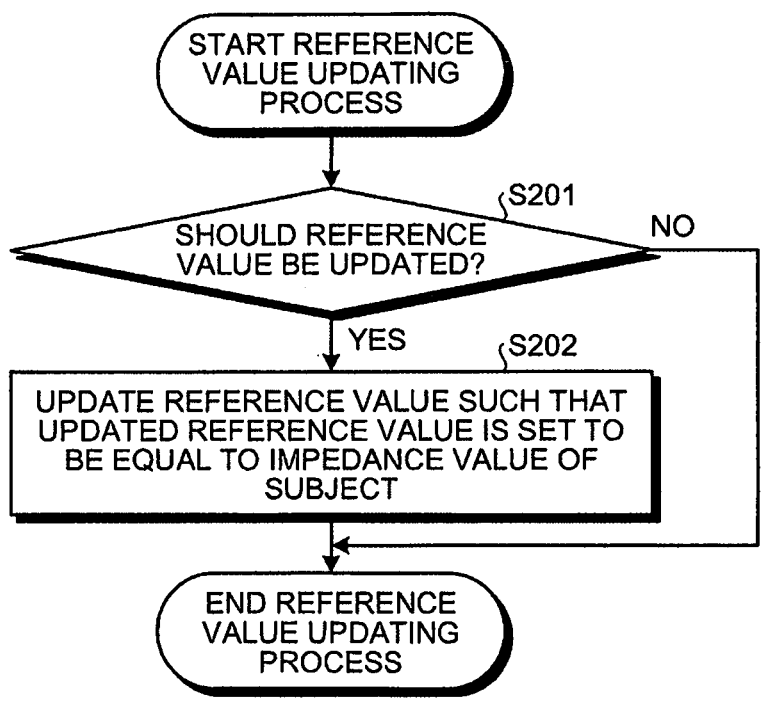
FIG. 4 is a flowchart for explaining a flow in a reference value updating process performed by the fingerprint authentication device.

Next, processes performed by the fingerprint authentication device 10 will be explained, with reference to FIGS. 3 and 4. FIG. 3 is a flowchart for explaining a flow in the processes performed by the fingerprint authentication device. FIG. 4 is a flowchart for explaining a flow in a reference value updating process performed by the fingerprint authentication device.

First, a flow in the processes performed by the fingerprint authentication device 10 will be explained, with reference to FIG. 3. As depicted in FIG. 3, when the fingerprint information obtaining unit 13 has received an operation for inputting a fingerprint image (step S101: Yes), the impedance value extracting unit 15 extracts the authenticated person's ID and a measurement result of an impedance value of the subject, out of the various types of information that have been obtained (step S102).

Subsequently, the fake body judgment unit 16 judges whether the subject is a fake body or a living body by verifying whether the impedance value of the subject is within the biometric information value range (step S103). In this situation, when a judgment result indicating that the subject is a fake body has been obtained (step S103: No), the individual judgment unit 19 outputs an authentication result indicating that the authentication process has failed (step S104), and the fingerprint authentication device ends the process. On the contrary, when a judgment result indicating that the subject is a living body has been obtained (step S103: Yes), the input fingerprint data extracting unit 17 extracts the authenticated person's ID and the fingerprint image of the subject, out of the various types of information that have been obtained (step S105).

After that, the fingerprint comparing unit 18 judges whether the subject is the authenticated person himself/herself, based on a comparison result obtained by comparing the comparison-purpose fingerprint image with the fingerprint image of the subject (step S106). In this situation, when a judgment result indicating that the subject is a person different from the authenticated person has been obtained (step S106: No), the individual judgment unit 19 outputs an authentication result indicating that the authentication process has failed (step S104), and the fingerprint authentication device 10 ends the process.

On the contrary, when a judgment result indicating that the subject is the authenticated person himself/herself has been obtained (step S106: Yes), the individual judgment unit 19 outputs an authentication result indicating that the authentication process has successfully been performed (step S107). After that, the update necessity judgment unit 20 and the update performing unit 21 perform a reference value updating process to update the reference value (step S108), and the fingerprint authentication device 10 ends the process.

Next, a flow in the reference value updating process (step S108) performed by the fingerprint authentication device 10 will be explained, with reference to FIG. 4. As depicted in FIG. 4, when an authentication result indicating that the authentication process has successfully been performed has been obtained, the update necessity judgment unit 20 judges whether the reference value should be updated according to the magnitude of the difference value between the reference value and the impedance value of the subject (step S201).

In this situation, when a judgment result indicating that the reference value should be updated has been obtained (step S201: Yes), the update performing unit 21 updates the reference value such that the updated reference value is set to be equal to the impedance value of the subject (step S202), and the fingerprint authentication device 10 ends the reference value updating process. On the contrary, when a judgment result indicating that the reference value should not be updated has been obtained (step S201: No), the fingerprint authentication device 10 ends the reference value updating process, without taking any further procedure.

[Advantageous Effect of First Embodiment]

As explained above, according to the first embodiment, it is possible to prevent misjudgments in the fake body judgment process that are caused by fluctuations in the biometric information value of the authenticated person. For example, according to the first embodiment, every time an authentication process has successfully been performed, the reference value is updated to be equal to the impedance value from a finger of the authenticated person obtained when the authentication process has successfully been performed. As a result, it is possible to prevent misjudgments in the fake body judgment process that are caused by fluctuations in the impedance value of the authenticated person by changing the biometric information value range such that the impedance value of the subject becomes distant from an end of the biometric information value range.

Figure 5:
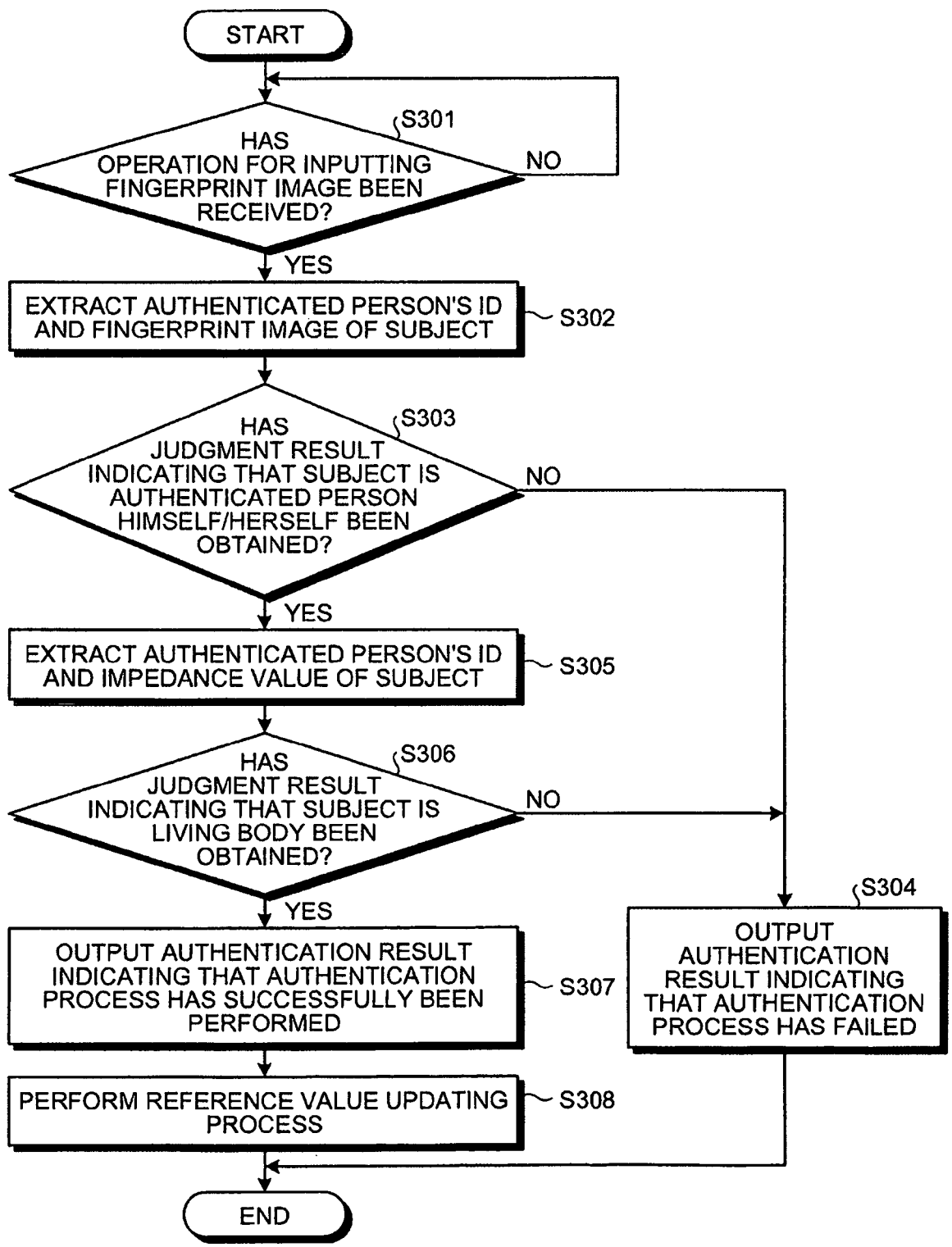
FIG. 5 is a drawing for explaining another embodiment example of the fingerprint authentication device according to the first embodiment.

In the description of the first embodiment, the example is explained in which, after it is judged whether the subject is a fake body or a living body, it is judged whether the subject is the authenticated person himself/herself. However, the present invention is not limited to this example. As another example, another arrangement is acceptable in which, as depicted in FIG. 5, after it is judged whether the subject is the authenticated person himself/herself (step S303), it is judged whether the subject is a fake body or a living body (step S306).

Also, in the description of the first embodiment, the example is explained in which a so-called one-to-one authentication process is performed, i.e., the biometric authentication process is performed by using the reference value and the authenticated person's fingerprint image that are specified based on the authenticated person's ID. However, the present invention is not limited to this example. It is possible to apply the present invention to another situation in which a so-called one-to-N authentication process is performed, i.e., the biometric authentication process is performed by using the reference values and the authenticated persons' fingerprint images that correspond to all the authenticated persons' IDs.

Figure 6:
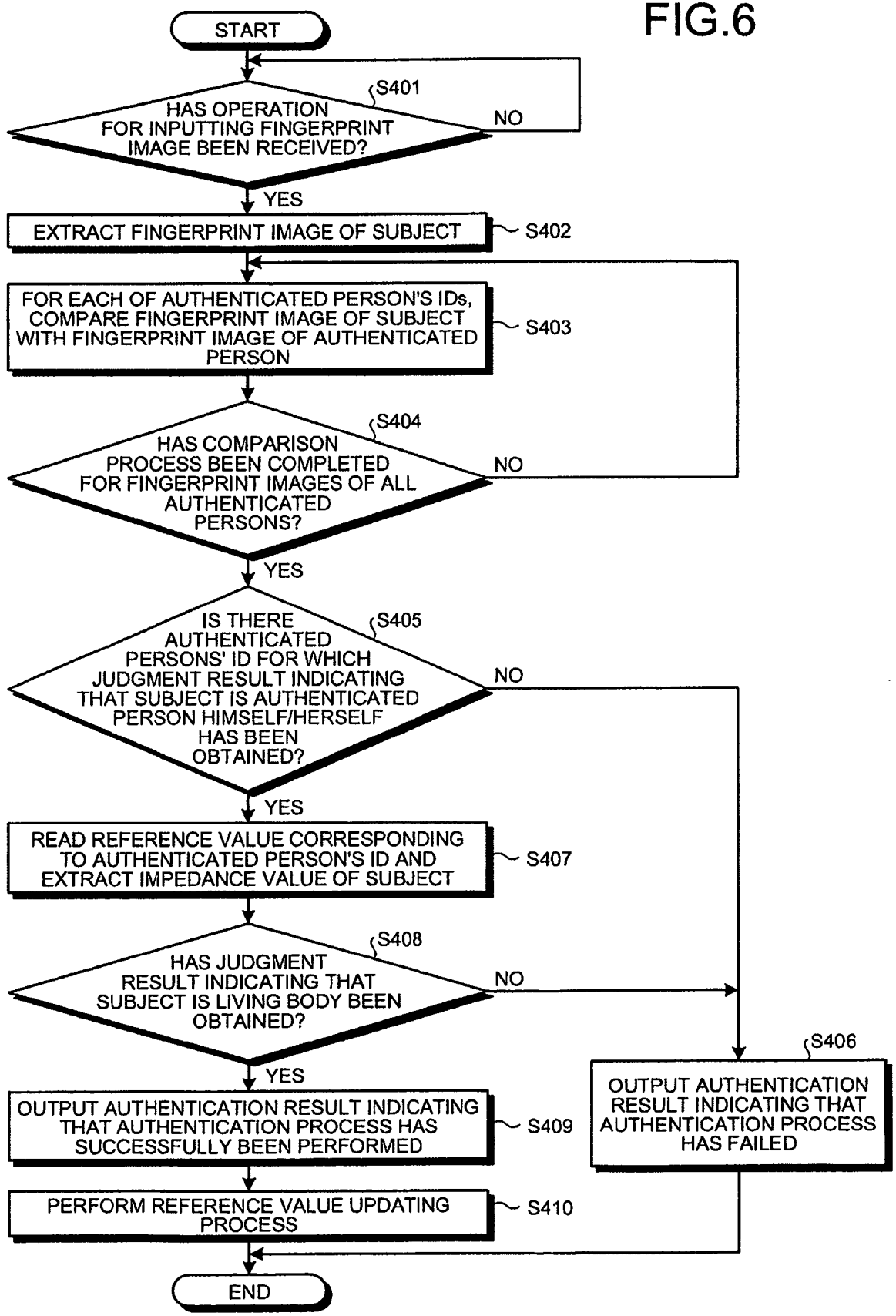
FIG. 6 is a drawing for explaining yet another embodiment example of the fingerprint authentication device according to the first embodiment.

More specifically, as depicted in FIG. 6, the fingerprint comparing unit 18 compares, for each of the authenticated persons' IDs, the fingerprint image of the subject with the authenticated person's fingerprint image (step S403). In this situation, when there is an authenticated person's ID for which a judgment result indicating that the subject is the authenticated person himself/herself has been obtained (step S405: Yes), the fake body judgment unit 16 reads the reference value corresponding to the authenticated person's ID for which the judgment result indicating that the subject is the authenticated person himself/herself has been obtained, and also extracts the measurement result of the impedance value of the subject (step S407). After that, the fake body judgment unit 16 judges whether the subject is a fake body by verifying whether the impedance value of the subject is within the biometric information value range (step S408).

[b] Second Embodiment

In the description of the first embodiment above, the example has been explained in which the reference value is updated when the difference value between the impedance value of the subject and the reference value is larger than the update threshold value. However, the situations in which the reference value is updated are not limited the example explained in the first embodiment. As a second embodiment of the present invention, another example will be explained in which, when the average value of difference values each of which has been stored into a storage unit whenever a judgment result indicating that the subject is a living body has been obtained is larger than an update threshold value, the reference value is updated. In the following sections, a configuration of a fingerprint authentication device according to the second embodiment, a flow in the processes performed by the fingerprint authentication device, and an advantageous effect of the second embodiment will be explained.

<Configuration of Fingerprint Authentication Device>

Figure 7:
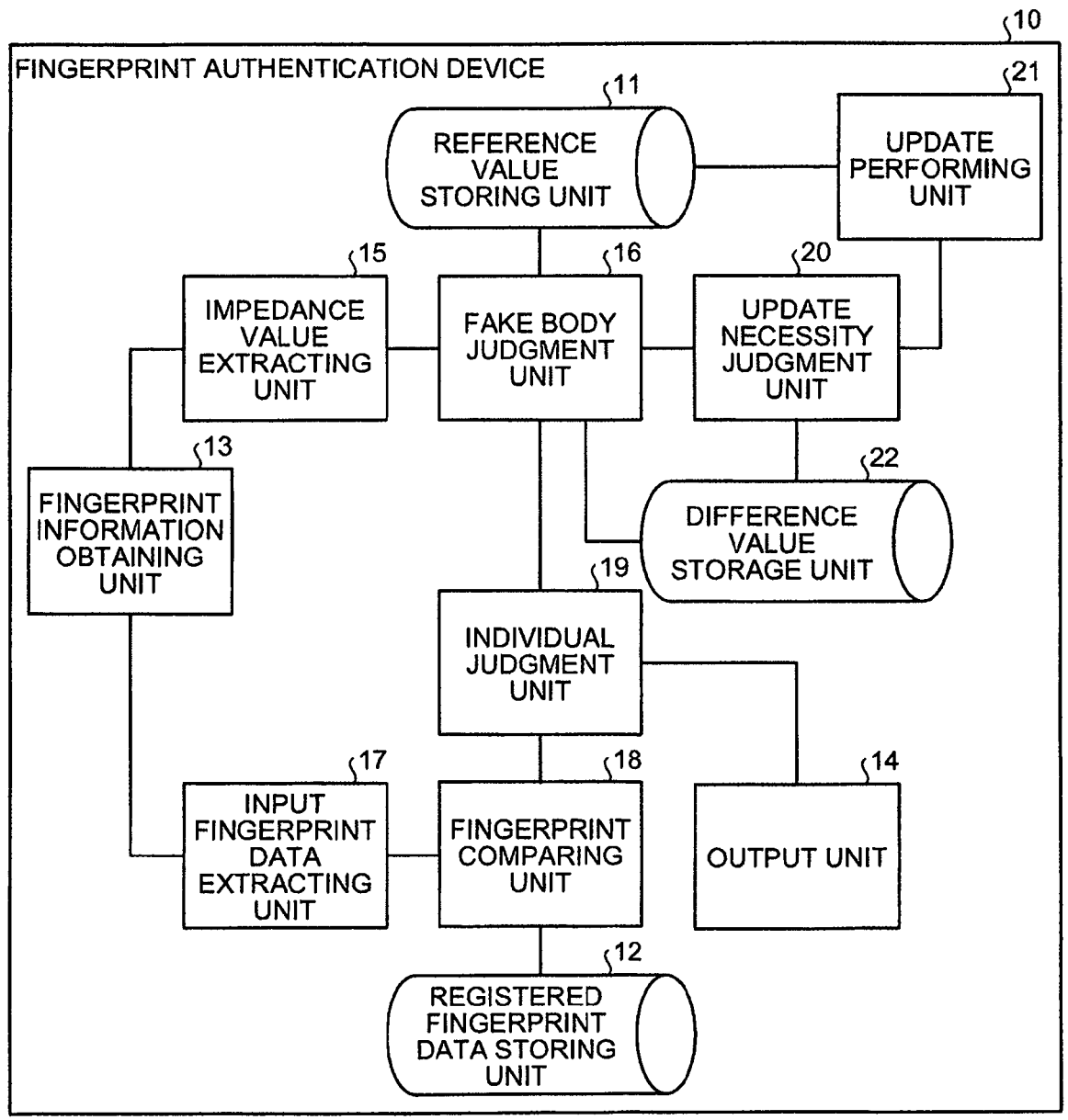
FIG. 7 is a block diagram of a fingerprint authentication device according to a second embodiment of the present invention.

The fingerprint authentication device according to the second embodiment differs from the fingerprint authentication device according to the first embodiment in the presence of a difference value storage unit 22 as depicted in FIG. 7 and the configuration described below. FIG. 7 is a block diagram of the fingerprint authentication device according to the second embodiment.

The difference value storage unit 22 stores therein difference values each of which is a difference between an impedance value of a subject and a reference value. More specifically, the difference value storage unit 22 stores therein an authenticated person's ID, a date on which a fake body judgment process has been performed, and a difference value, while being associated with one another. It is assumed that the information stored in the difference value storage unit 22 is automatically deleted when the number of days that have elapsed since the information was stored has reached a specific number of days that is specified in advance.

Every time it has been judged that a subject is a living body, the fake body judgment unit 16 stores the authenticated person's ID, the date on which the fake body judgment process has been performed, and the difference value between the impedance value of the subject and the reference value, into the difference value storage unit 22.

The update necessity judgment unit 20 calculates the average value of the difference values each of which is a difference between a biometric information value that is input from the subject and the center value of a biometric information value range. When the calculated average value is larger than an update threshold value that is specified as a condition for updating the biometric information value range, the update necessity judgment unit 20 causes the biometric information value range to be updated.

More specifically, when the individual judgment unit 19 has obtained an authentication result indicating that the authentication process has successfully been performed, the update necessity judgment unit 20 reads all the difference values that correspond to the authenticated person's ID contained in the input data, from the difference value storage unit 22, and calculates the average value of the difference values. After that, the update necessity judgment unit 20 judges whether the reference value should be updated by comparing the average value with the update threshold value. In this situation, when the average value is larger than the update threshold value, the update necessity judgment unit 20 judges that the reference value should be updated. On the contrary, when the average value is equal to or smaller than the update threshold value, the update necessity judgment unit 20 judges that the reference value should not be updated.

<Processes Performed by Fingerprint Authentication Device>

Figure 8:
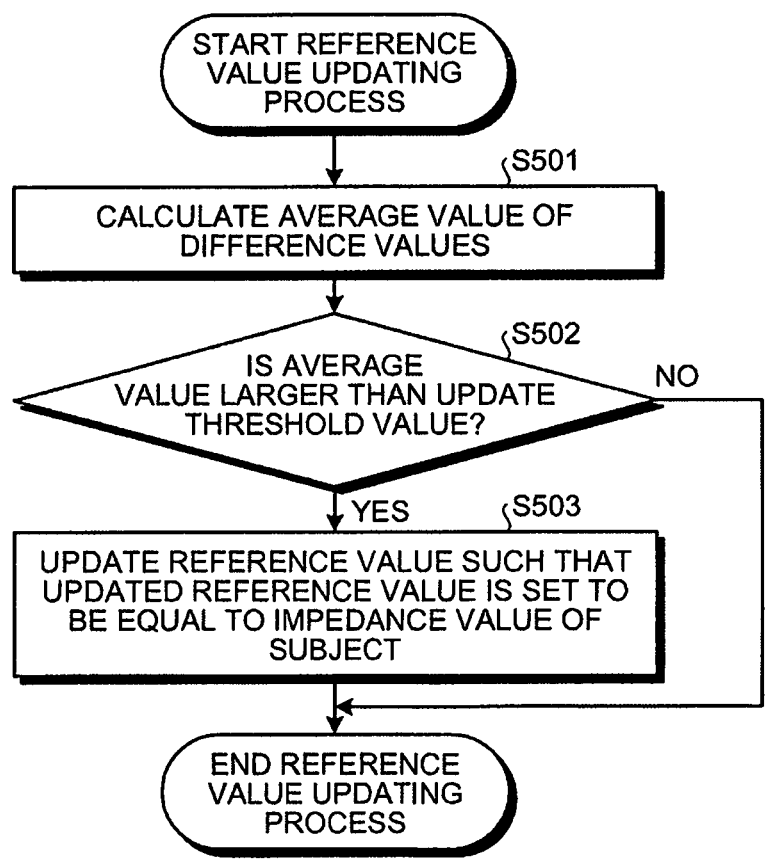
FIG. 8 is a flowchart for explaining a flow in a reference value updating process performed by the fingerprint authentication device according to the second embodiment.

Next, a flow in a reference value updating process performed by the fingerprint authentication device 10 according to the second embodiment will be explained, with reference to FIG. 8. FIG. 8 is a flowchart for explaining the flow in the reference value updating process performed by the fingerprint authentication device according to the second embodiment.

As depicted in FIG. 8, when an authentication result indicating that an authentication process has successfully been performed has been obtained, the update necessity judgment unit 20 calculates the average value of the difference values corresponding to the authenticated person's ID contained in the input data (step S501) and judges whether the reference value should be updated by comparing the calculated average value with the update threshold value (step S502). In this situation, when a judgment result indicating that the reference value should be updated has been obtained (step S502: Yes), the update performing unit 21 updates the reference value such that the updated reference value is set to be equal to the impedance value of the subject (step S503), and the fingerprint authentication device 10 ends the reference value updating process. On the contrary, when a judgment result indicating that the reference value should not be updated has been obtained (step S502: No), the fingerprint authentication device 10 ends the reference value updating process, without taking any further procedure.

<Advantageous Effect of Second Embodiment>

Figure 9:
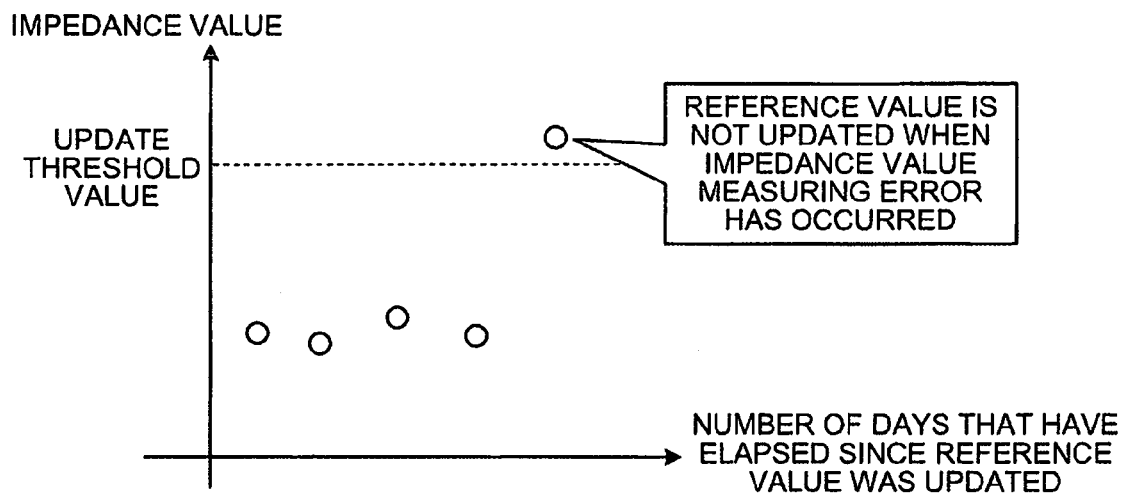
FIG. 9 is a drawing for explaining an advantageous effect of the second embodiment.

As explained above, according to the second embodiment, it is possible to further prevent misjudgments in the fake body judgment process by changing the biometric information value range according to the magnitude of the average value of the biometric information values that have been input from the subject is. For example, according to the second embodiment, it is possible to further prevent misjudgments in the fake body judgment process by updating the reference value only when there is a high possibility that the impedance value of the authenticated person has fluctuated (see FIG. 9).

Another arrangement is also acceptable in which the biometric information value range is updated when a difference value has gradually increased as days have elapsed, the difference value being calculated between the center value of the biometric information value range and a biometric information value that is input from the subject and has been stored in the storage unit associated with the date on which the subject was judged to be a living body.

Figure 10:
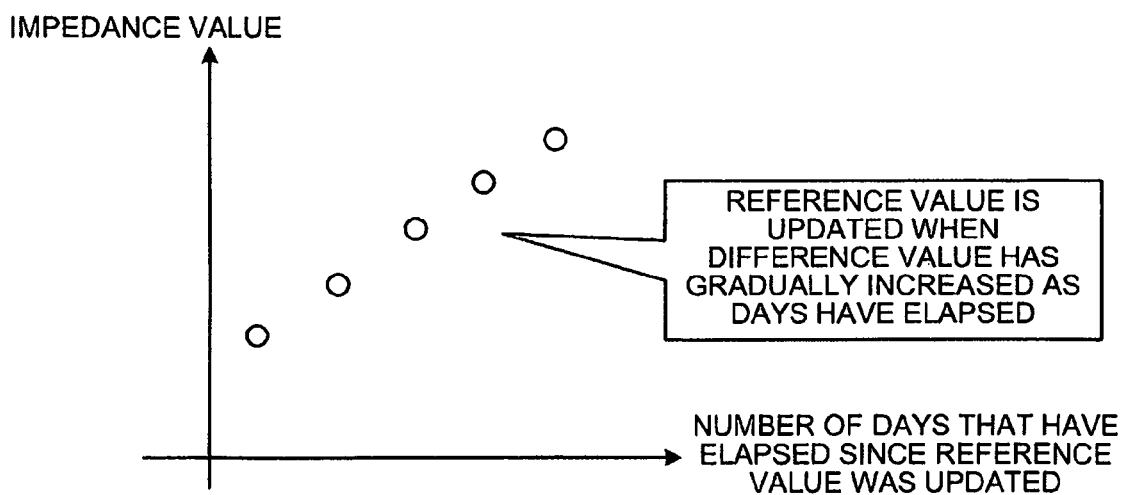
FIG. 10 is a drawing for explaining another embodiment example of the fingerprint authentication device according to the second embodiment.

More specifically, as depicted in FIG. 10, the update necessity judgment unit 20 reads all the difference values that correspond to the authenticated person's ID contained in the input data, from the difference value storage unit 22. In this situation, when each of all the difference values has become larger than the difference value that was stored at an immediately preceding time, the update necessity judgment unit 20 judges that the reference value should be updated. On the contrary, when there are one or more difference values each of which has become smaller than the difference value that was stored at an immediately preceding time, the update necessity judgment unit 20 judges that the reference value should not be updated.

Alternatively, another arrangement is acceptable in which a standard deviation value of difference values is calculated, the difference values each being a difference between a biometric information value that is input from the subject and the center value of a biometric information value range, so that the biometric information value range is updated when the calculated standard deviation value is smaller than an update threshold value that is specified as a condition for updating the biometric information value range. More specifically, the update necessity judgment unit 20 calculates a standard deviation value of the difference values each of which has been stored into the storage unit whenever a judgment result indicating that the subject is a living body has been obtained and, when the calculated standard deviation value is smaller than the update threshold value (i.e., when the dispersion of the difference values is small), the update necessity judgment unit 20 causes the reference value to be updated. It should be noted that the update threshold value used in herein is different from the update threshold values used in the first and the second embodiments.

Yet another arrangement is acceptable in which the biometric information value range is updated when a difference between an end of the biometric information value range before being updated and an end of the biometric information value range after being updated is equal to or smaller than an update permitting threshold value that is specified as a condition for updating the biometric information value range. More specifically, when the difference value between a reference value before being updated and a reference value after being updated is equal to or smaller than the update permitting threshold value that is specified as a condition for updating the reference value, the update necessity judgment unit 20 causes the reference value to be updated.

[c] Third Embodiment

In the description of the first and the second embodiments, the examples have been explained in which, when a judgment result indicating that the subject is the authenticated person himself/herself has been obtained, the reference value is updated. However, another arrangement is acceptable in which, it is judged whether the reference value should be updated according to a comparison result obtained by comparing a fingerprint image of the subject with the fingerprint image of the authenticated person. Accordingly, an example in which it is judged whether the reference value should be updated according to a comparison result that is obtained by using the fingerprint image of the authenticated person will be explained as a third embodiment of the present invention. In the following sections, a configuration of a fingerprint authentication device according to the third embodiment, a flow in the processes performed by the fingerprint authentication device, and an advantageous effect of the third embodiment will be explained.

<Configuration of Fingerprint Authentication Device>

Figure 11:
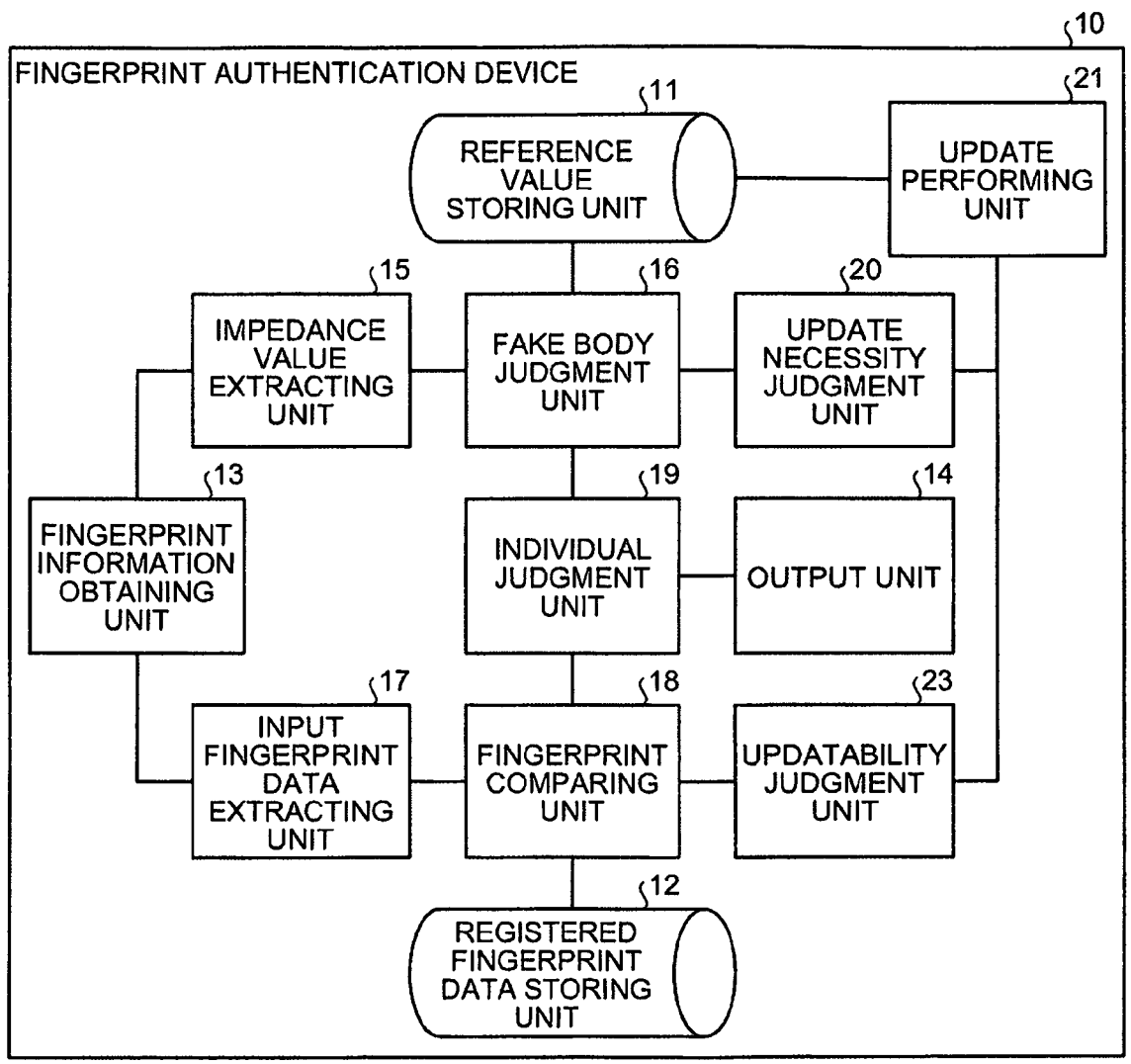
FIG. 11 is a block diagram of a fingerprint authentication device according to a third embodiment of the present invention.

The fingerprint authentication device according to the third embodiment differs fro the fingerprint authentication device according to the first embodiment in the presence of an updatability judgment unit 23 as depicted in FIG. 11 and the configuration described below. FIG. 11 is a block diagram of the fingerprint authentication device according to the third embodiment.

The updatability judgment unit 23 causes the biometric information value range to be updated according to a judgment result obtained by the fingerprint comparing unit 18. More specifically, when the update necessity judgment unit 20 has obtained a judgment result indicating that the reference value should be updated, the updatability judgment unit 23 obtains a comparison score from the fingerprint comparing unit 18, the comparison score indicating a matching degree between a fingerprint image of the subject and a comparison-purpose fingerprint image. After that, the updatability judgment unit 23 judges whether an update of the reference value should be permitted by comparing the comparison score with an update permitting score that is specified as a condition used for judging whether the reference value should be updated.

In this situation, when the comparison score is larger than the update permitting score, the updatability judgment unit 23 judges that the update of the reference value should be permitted. On the contrary, when the comparison score is equal to or smaller than the update permitting score, the updatability judgment unit 23 judges that the update of the reference value should not be permitted. The update permitting score is a predetermined value that is equal to or larger than the success/failure judgment threshold value described above.

The update performing unit 21 updates the biometric information value range according to the judgment result obtained by the updatability judgment unit 23. More specifically, when the updatability judgment unit 23 has obtained a judgment result indicating that the update of the reference value should be permitted, the update performing unit 21 updates the reference value stored in the reference value storing unit 11 such that the updated reference value is set to be equal to the measured impedance value of the subject. On the contrary, when the updatability judgment unit 23 has obtained a judgment result indicating that the update of the reference value should not be permitted, the update performing unit 21 ends the process, without taking any further procedure.

<Processes Performed by Fingerprint Authentication Device>

Figure 12:
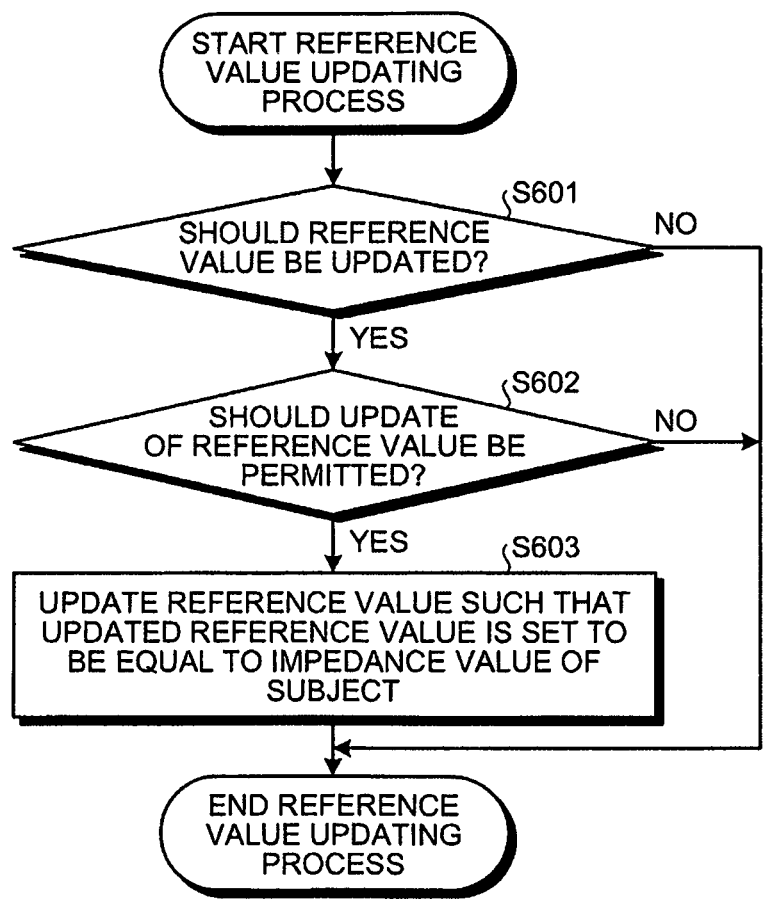
FIG. 12 is a flowchart for explaining a flow in a reference value updating process performed by the fingerprint authentication device according to the third embodiment.

Next, a flow in the reference value updating process performed by the fingerprint authentication device 10 according to the third embodiment will be explained, with reference to FIG. 12. FIG. 12 is a flowchart for explaining a flow in the reference value updating process performed by the fingerprint authentication device.

As depicted in FIG. 12, when an authentication result indicating that an authentication process has successfully been performed has been obtained, the update necessity judgment unit 20 judges whether the reference value should be updated by comparing the difference value between the impedance value of the subject and the reference value with the update threshold value (step S601). In this situation, when a judgment result indicating that the reference value should not be updated has been obtained (step S601: No), the fingerprint authentication device 10 ends the reference value updating process, without taking any further procedure. On the contrary, when a judgment result indicating that the reference value should be updated has been obtained (step S601: Yes), the updatability judgment unit 23 judges whether an update of the reference value should be permitted by comparing the update permitting score with the comparison score (step S602).

In this situation, when a judgment result indicating that the update should be permitted has been obtained (step S602: Yes), the update performing unit 21 updates the reference value such that the updated referemce value is set to be equal to the impedance value of the subject (step S603), and the fingerprint authentication device 10 ends the reference value updating process. On the contrary, when a judgment result indicating that the update should not be permitted has been obtained (step S602: No), the fingerprint authentication device 10 ends the reference value updating process, without taking any further procedure.

<Advantageous Effect of Third Embodiment>

As explained above, according to the third embodiment, it is possible to further prevent misjudgments in the fake body judgment process by changing the biometric information value range according to the comparison result that is obtained by using the personal identification information of the subject. For example, according to the third embodiment, it is possible to further prevent misjudgments in the fake body judgment process by updating the reference value only when the matching degree between the fingerprint image of the subject and the comparison-purpose fingerprint image is high.

In some situations, to perform a biometric authentication process in a stricter manner, the success/failure judgment threshold value may be set to a value larger than a commonly-used success/failure judgment threshold value. In such situations, an arrangement is acceptable in which the biometric information value range is updated even when a judgment result indicating that the subject is a person different from the authenticated person has been obtained. In other words, it is sufficient if it is possible to judge whether the subject is real or fake. Thus, it is acceptable to change the biometric information value range if the matching degree between the personal identification information of the subject and the comparison-purpose personal identification information is high.

Figure 13:
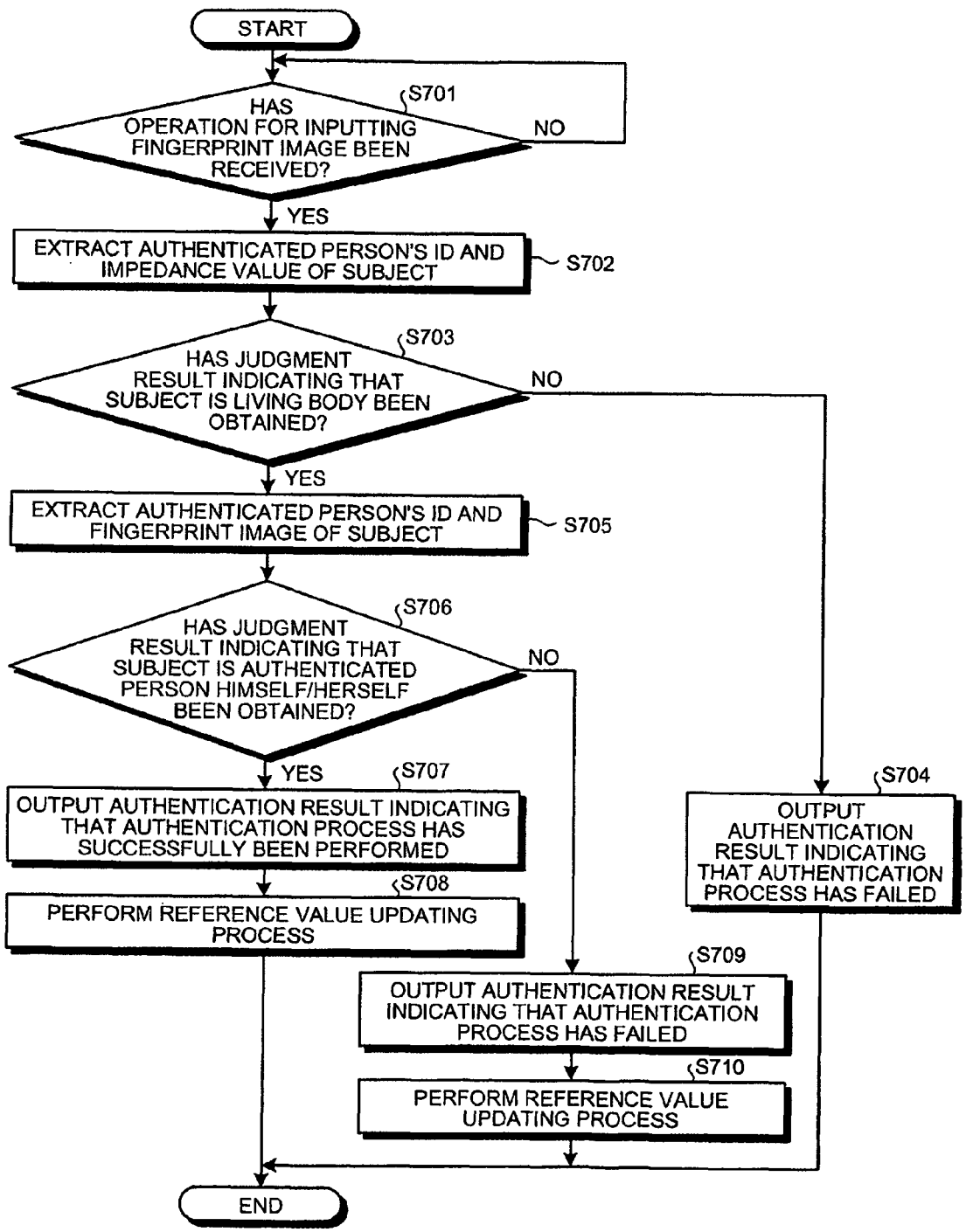
FIG. 13 is a drawing for explaining another embodiment example of the fingerprint authentication device according to the third embodiment.

More specifically, as depicted in FIG. 13, when a judgment result indicating that the subject is a person different from the authenticated person has been obtained (step S706: No), the individual judgment unit 19 outputs an authentication result indicating that the authentication process has failed (step S709). Subsequently, the update necessity judgment unit 20, the update performing unit 21, and the updatability judgment unit 23 perform the reference value updating process to update the reference value (step S710), and the fingerprint authentication device 10 ends the process. In this situation, the update permitting score used by the updatability judgment unit 23 is a predetermined value that is smaller than the success/failure threshold value.

Alternatively, another arrangement is acceptable in which the biometric information value range is updated when a comparison score indicating a matching degree between the personal identification information of the subject and the comparison-purpose personal identification information is larger than a predetermined threshold value. More specifically, the updatability judgment unit 23 calculates the average value of comparison scores each indicating a matching degree between the comparison-purpose fingerprint image and each fingerprint image of the subject that have been stored into the storage unit whenever a judgment result indicating that a biometric authentication process has successfully been performed has been obtained, so that the reference value is updated when the calculated average value is larger than the predetermined threshold value.

[d] Fourth Embodiment

In the first, the second, and the third embodiments described above, the examples have been explained in which the reference value is updated to be equal to the biometric information value of the subject. However, the reference value after an update is not limited to the biometric information value of the subject. Accordingly, an example in which the reference value is updated to be equal to the average value of biometric information values of the subject will be explained, as a fourth embodiment of the present invention. In the following sections, a configuration of the fingerprint authentication device according to the fourth embodiment, a flow in the processes performed by the fingerprint authentication device, and an advantageous effect of the fourth embodiment will be explained.

<Configuration of Fingerprint Authentication Device>

Figure 14:
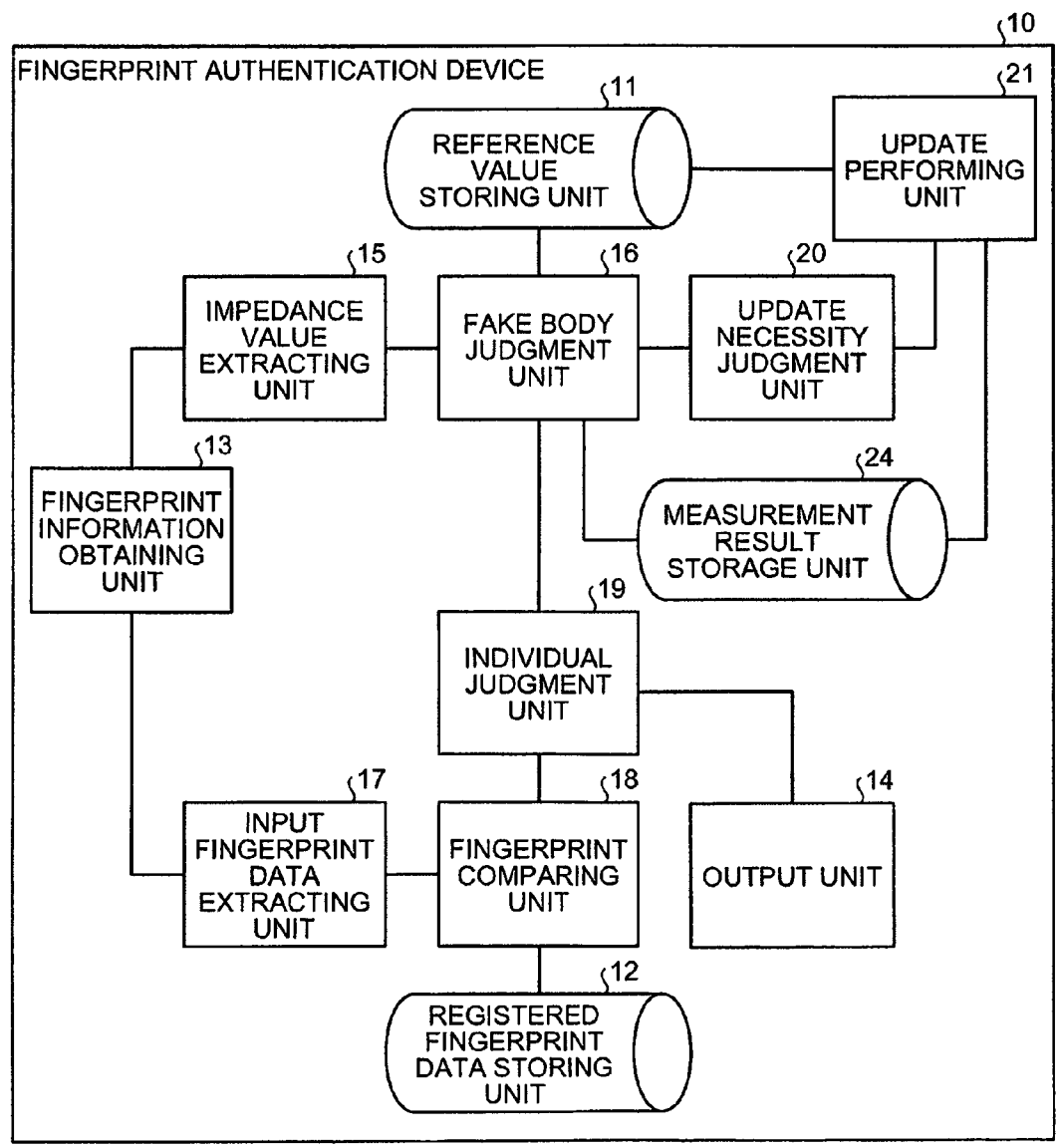
FIG. 14 is a block diagram of a fingerprint authentication device according to a fourth embodiment of the present invention.

The fingerprint authentication device according to the fourth embodiment differs from the fingerprint authentication device according to the first embodiment in the presence of a measurement result storage unit 24 as depicted in FIG. 14 and the configuration described below. FIG. 14 is a block diagram of the fingerprint authentication device according to the fourth embodiment.

The measurement result storage unit 24 stores therein measurement results of impedance values of the subject. More specifically, the measurement result storage unit 24 stores therein an authenticated person's ID and the measurement results of impedance values of the subject, while being associated with one another.

Every time the fake body judgment unit 16 receives input data from the impedance value extracting unit 15, the fake body judgment unit 16 stores the authenticated person's ID contained in the input data and the measurement result of the impedance value of the subject into the measurement result storage unit 24, while being associated with each other.

The update performing unit 21 calculates the average value of biometric information values each of which has been stored into the storage unit whenever the subject has been judged to be a living body and updates the biometric information value range such that the calculated average value is a center value of the updated biometric information value range. More specifically, when the update necessity judgment unit 20 has obtained a judgment result indicating that the reference value should be updated, the update performing unit 21 reads all the measurement results corresponding to the authenticated person's ID contained in the input data, from the measurement result storage unit 24, and calculates the average value of the measurement results. Subsequently, the update performing unit 21 updates the reference value stored in the reference value storing unit 11 such that the updated reference value is set to be equal to the average value of the measurement results.

<Processes Performed by Fingerprint Authentication Device>

Figure 15:
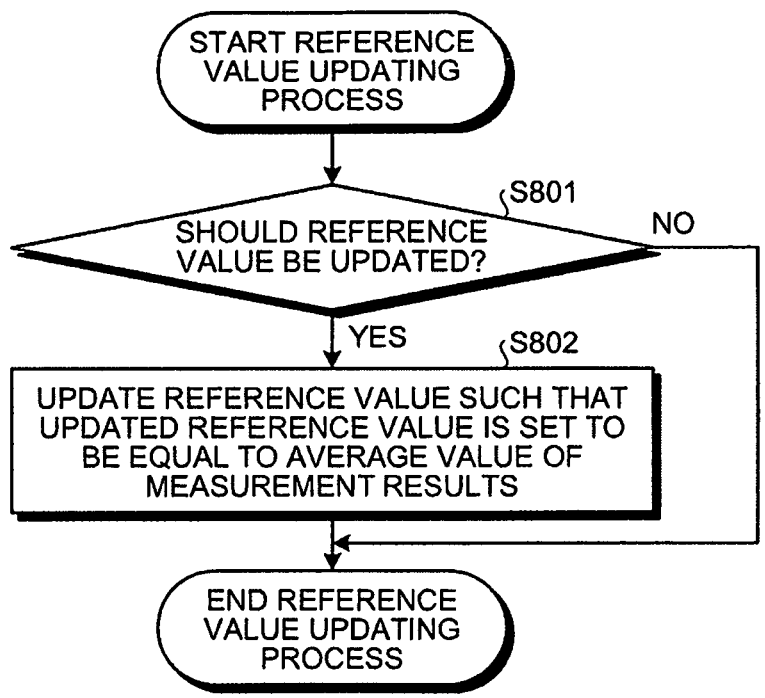
FIG. 15 is a flowchart for explaining a flow in a reference value updating process performed by the fingerprint authentication device according to the fourth embodiment.

Next, a flow in the reference value updating process performed by the fingerprint authentication device 10 according to the fourth embodiment will be explained, with reference to FIG. 15. FIG. 15 is a flowchart for explaining a flow in the reference value updating process performed by the fingerprint authentication device according to the fourth embodiment.

As depicted in FIG. 15, when an authentication result indicating that an authentication process has successfully been performed has been obtained, the update necessity judgment unit 20 judges whether the reference value should be updated by comparing the difference value between the impedance value of the subject and the reference value with an update threshold value (step S801). When a judgment result indicating that the reference value should be updated has been obtained (step S801: Yes), the update performing unit 21 updates the reference value such that the updated reference value is set to be equal to the average value of the measurement results (step S802), and the fingerprint authentication device 10 ends the reference value updating process. On the contrary, when a judgment result indicating that the reference value should not be updated has been obtained (step S801: No), the fingerprint authentication device 10 ends the reference value updating process, without taking any further procedure.

<Advantageous Effect of Fourth Embodiment>

As explained above, according to the fourth embodiment, it is possible to further prevent misjudgments in the fake body judgment process by updating the biometric information value range such that the average value of the biometric information values that are input from the subject is a center value of the updated biometric information value range. For example, according to the fourth embodiment, it is possible to further prevent misjudgments in the fake body judgment process by changing the reference value to be equal to the average value of the impedance values obtained from a finger of the authenticated person, the impedance values being measured at the times when an authentication result indicating that an authentication process has successfully been performed has been obtained.

[e] Fifth Embodiment

The first through the fourth embodiments of the present invention have been explained above. It is, however, possible to realize the present invention in various embodiments other than the exemplary embodiments described above. Thus, in the following sections, other embodiment examples will be explained as a fifth embodiment of the present invention.

(1) Biometric Information Values

For instance, in the description of the first through the fourth embodiments above, the examples are explained in which it is judged whether the subject is a fake body or a living body by using the impedance value. However, the present invention is not limited to these examples. As another example, it is possible to apply the present invention to other situations in which it is judged whether the subject is a fake body or a living body by using other biometric information values each of which the level value fluctuates over the course of time, such as a level value of a reflection wave in response to an applied signal, darkness of the skin color, and a capacitance.

(2) Fake Body Judgment Device and Biometric Authentication Device

In the description of the first through the fourth embodiments above, the examples are explained in which it is judged whether the subject is the authenticated person himself/herself, based on the comparison result obtained by comparing the comparison-purpose fingerprint image with the fingerprint image of the subject. However, the present invention is not limited to these examples. As another example, it is possible to implement the present invention as a fake body judgment device that has only the function of judging whether a subject is a fake body. It is also possible to implement the present invention as a biometric authentication device that performs a personal authentication process by using biometric information such as irises, veins, and faces.

(3) Format Versions

Figure 16:
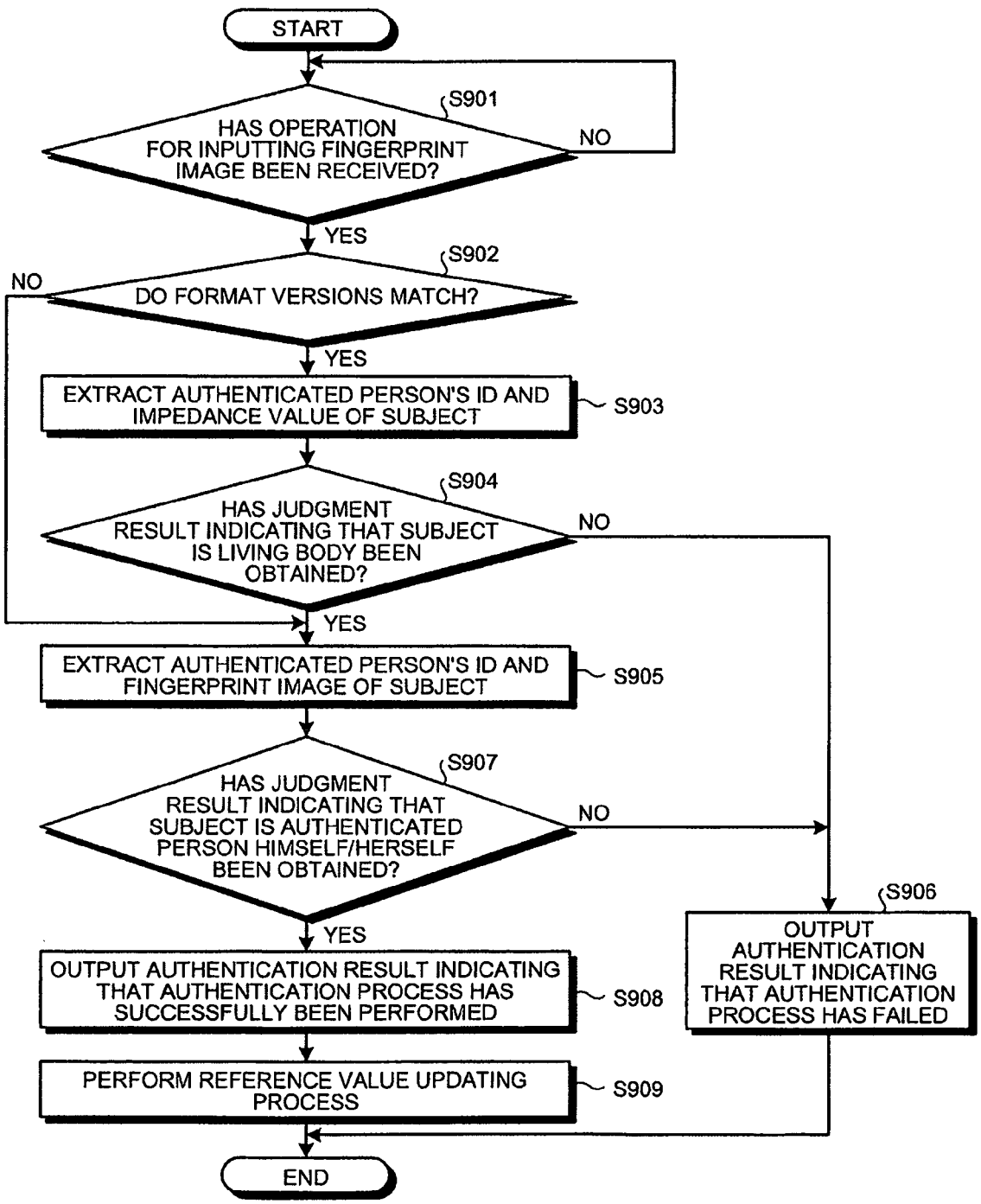
FIG. 16 is a drawing for explaining another embodiment example of the fingerprint authentication devices.

In any of the first through the fourth embodiments described above, another arrangement is acceptable in which, when a format version of the biometric information value that is input from the subject is different from a format version of the reference value used for specifying the biometric information value range, the format version of the reference value is updated. More specifically, as depicted in FIG. 16, when the fingerprint authentication device 10 has received an operation for inputting a fingerprint image (step S901: Yes), the fingerprint authentication device 10 compares the format version of the reference value stored in the reference value storing unit 11 with the format version of the measured biometric information value of the subject (step S902).

In this situation, when those two format versions match (step S902: Yes), the fingerprint authentication device 10 extracts the authenticated person's ID and the measurement result of the impedance value of the subject, out of the various types of information that have been obtained (step S903). On the contrary, when those two format versions are different from each other (step S902: No), the fingerprint authentication device 10 extracts the authenticated person's ID and the fingerprint image of the subject, out of the various types of information that have been obtained (step S905).

(4) New Registrations

Figure 17:
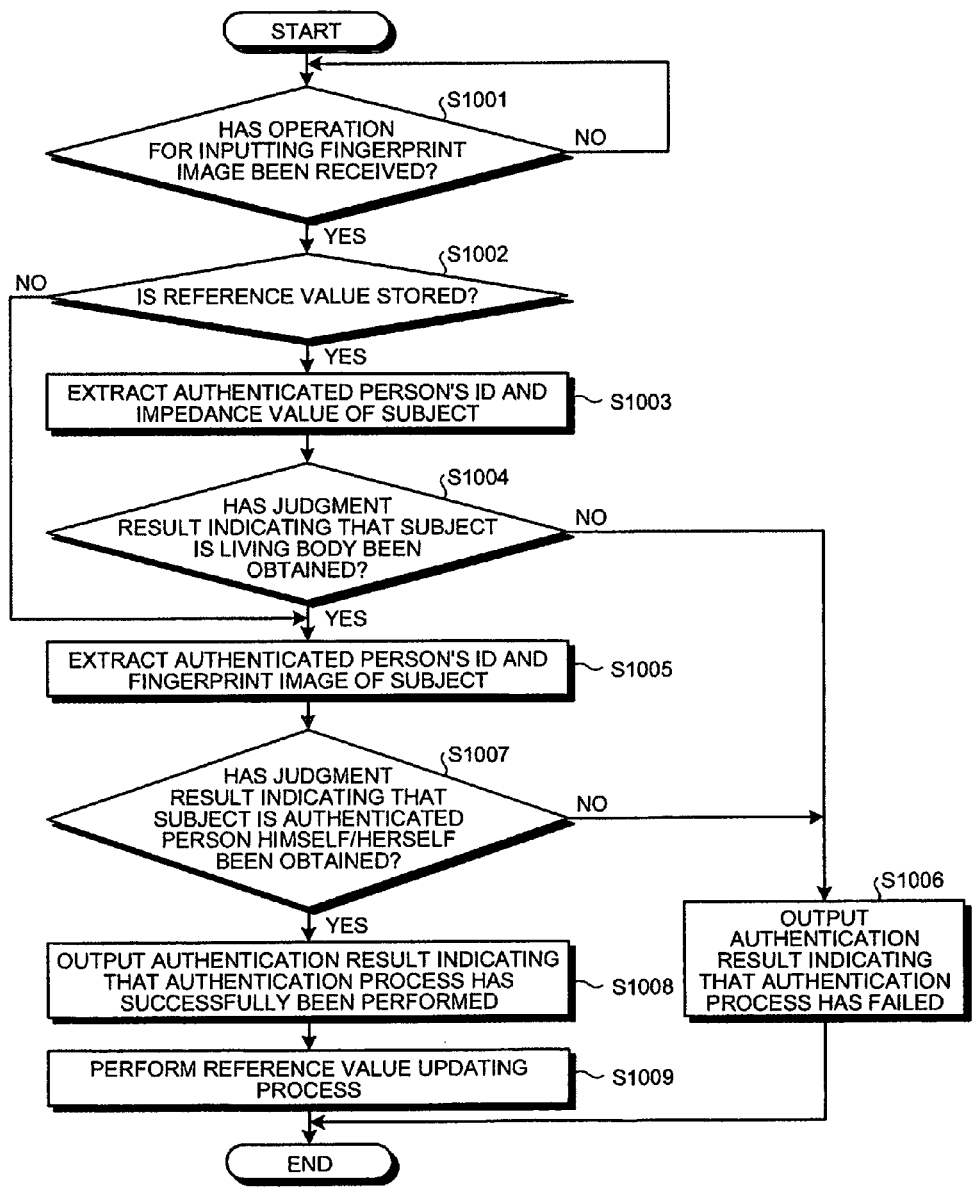
FIG. 17 is yet another embodiment example of the fingerprint authentication devices.

Further, in any of the first through the fourth embodiments described above, yet another arrangement is acceptable in which it is judged whether a biometric information value range has been registered and, when no biometric information value range has been registered, a new biometric information value range set such that the biometric information value is a center value of the new biometric information value range is registered. More specifically, as depicted in FIG. 17, when the fingerprint authentication device 10 has received an operation for inputting a fingerprint image (step S1001: Yes), the fingerprint authentication device 10 judges whether a reference value is stored in the reference value storing unit 11 associated with the authenticated person's ID that has been input (step S1002).

In this situation, when a reference value is stored (step S1002: Yes), the fingerprint authentication device 10 extracts the authenticated person's ID and the measurement result of the impedance value of the subject, out of the various types of information that have been obtained (step S1003). After that, the fingerprint authentication device 10 judges whether the subject is a fake body or a living body, based on a comparison result obtained by comparing the reference value corresponding to the authenticated person's ID that has been input with the impedance value of the subject (step S1004). On the contrary, when no reference value is stored (step S1002: No), the fingerprint authentication device 10 extracts the authenticated person's ID and the fingerprint image of the subject, out of the various types of information that have been obtained (step S1005).

(5) Backing Up Biometric Information Value Range Before Being Updated

In any of the first through the fourth embodiments described above, an arrangement is acceptable in which, every time a biometric information value range is updated, the biometric information value range (or the reference value) before being updated is stored as an update history record.

(6) Notifying Administrator that Biometric Information Value Range has been Updated In any of the first through the fourth embodiments described above, an arrangement is acceptable in which, when a biometric information value range has been updated, an administrator who manages the biometric authentication device is notified that the biometric information value range (or the reference value) has been updated.

(7) Configurations of Devices

The process procedure, the control procedure, specific names, and information including various types of data and parameters (e.g., the reference value) explained in the specification and depicted in the drawings may be arbitrarily changed unless otherwise specified.

Further, each component of the devices depicted in FIGS. 2, 7, 11, and 14 is conceptual in function, and is not necessarily physically configured as depicted. That is, the specific patterns of distribution and unification of the components are not meant to be restricted to those depicted in the drawings. All or part of the components may be functionally or physically distributed or unified in arbitrary units according to various types of loads and the state of use. For example, it is acceptable to configure a device by unifying the update necessity judgment unit 20 and the update performing unit 21 depicted in FIG. 2 together.

(8) Biometric Authentication Computer Program

Figure 18:
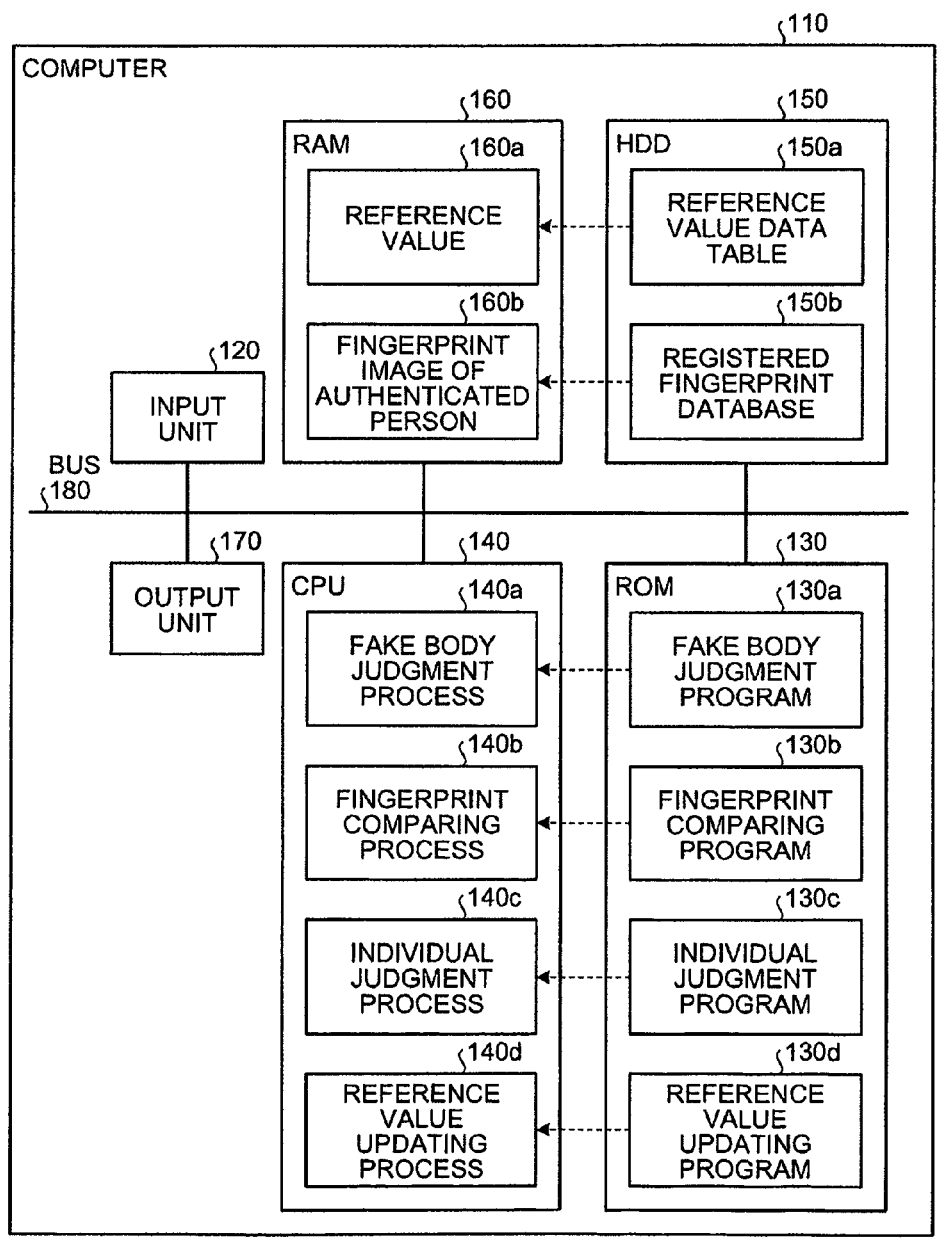
FIG. 18 is a diagram of a computer that executes a biometric authentication computer program.

All or arbitrary part of the process functions that are performed by the fingerprint authentication device 10 and are explained in the description of the first through the fourth embodiments may be achieved by a Central Processing Unit (CPU) and a computer program (hereinafter, "program") analyzed and executed on that CPU, or may be achieved as hardware with a wired logic. Accordingly, in the following sections, a computer that executes a biometric authentication computer program (hereinafter, the "biometric authentication program") that has the same functions as those of the fingerprint authentication device 10 described in the exemplary embodiments above will be explained as an example, with reference to FIG. 18. FIG. 18 is a diagram of a computer that executes the biometric authentication program.

As depicted in FIG. 18, a computer 110 serving as the fingerprint authentication device 10 includes an input unit 120, a Read-Only Memory (ROM) 130, a CPU 140, a Hard Disk Drive (HDD) 150, a Random Access Memory (RAM) 160, and an output unit 170, which are all connected via a bus 180 or the like. The input unit 120 corresponds to the fingerprint information obtaining unit 13 depicted in FIG. 2, and the output unit 170 corresponds to the output unit 14 depicted in FIG. 2.

The ROM 130 stores therein, in advance, a biometric authentication program that achieves the same functions as those of the fingerprint authentication device 10 explained in the first embodiment above. That is, as depicted in FIG. 18, the ROM 130 stores therein, in advance, a fake body judgment program 130a, a fingerprint comparing program 130b, an individual judgment program 130c, and a reference value updating program 130d. Any of the programs 130a to 130d may be distributed or unified, as necessary, like the constituent components of the fingerprint authentication device 10 depicted in FIG. 2.

When the CPU 140 reads the programs 130a to 130d from the ROM 130 and executes the read programs, the programs 130a to 130d function as a fake body judgment process 140a, a fingerprint comparing process 140b, an individual judgment process 140c, and a reference value updating process 140d, as depicted in FIG. 18.

The fake body judgment process 140a corresponds to the impedance value extracting unit 15 and the fake body judgment unit 16 that are depicted in FIG. 2. The fingerprint comparing process 140b corresponds to the input fingerprint data extracting unit 17 and the fingerprint comparing unit 18 that are depicted in FIG. 2. The individual judgment process 140c corresponds to the individual judgment unit 19 that is depicted in FIG. 2. The reference value updating process 140d corresponds to the update necessity judgment unit 20 and the update performing unit 21 that are depicted in FIG. 2.

Further, as depicted in FIG. 18, the HDD 150 includes a reference value data table 150a and a registered fingerprint database 150b. The CPU 140 reads a reference value 160a and a fingerprint image 160b of an authenticated person, out of the reference value data table 150a and the registered fingerprint database 150b and stores the reference value 160a and the fingerprint image 160b into the RAM 160. The CPU 140 then executes processes based on the reference value 160a and the fingerprint image 160b of the authenticated person stored in the RAM 160. The reference value data table 150a and the registered fingerprint database 150b correspond to the reference value storing unit 11 and the registered fingerprint data storing unit 12 that are depicted in FIG. 2, respectively.

The programs 130a to 130d described above is not necessarily required be stored in the ROM 130 in advance. For example, the programs may be stored in a "portable physical medium" to be inserted into the computer 110, such as a flexible disk (FD), a Compact Disk Read-Only Memory (CD-ROM), a Digital Versatile Disk (DVD), a magnetooptical disk, or an Integrated Circuit (IC) card; a "fixed physical medium" that is provided on the inside or the outside of the computer 110 such as a HDD; or further "another computer (or a server)" that is connected to the computer 110 via a public line, the Internet, a Local Area Network (LAN), or a Wide Area Network (WAN), and be read by the computer 110 therefrom for execution.

(9) Biometric Authentication Method

Based on the biometric authentication device described above, it is possible to realize a biometric authentication method that includes: judging whether a subject is a fake body or a living body by verifying whether a biometric information value that is input from the subject is within a biometric information value range that has been registered in advance (for example step S103 depicted in FIG. 3); and updating, when the subject has been judged to be a living body in the fake body judgment step, the biometric information value range such that the difference between the biometric information value that is input from the subject and an end of the biometric information value range becomes larger (for example, step S108 depicted in FIG. 3).

By using the biometric authentication device, the fake body judgment device, the biometric authentication method, and the biometric authentication computer program according to an aspect disclosed above, it is possible to prevent misjudgments in the fake body judgment process that are caused by fluctuations in the biometric information value of an authenticated person.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A biometric authentication device comprising:
   a fake body judgment unit that judges whether a subject is a fake body by verifying whether a biometric information value that is input from the subject is within a biometric information value range that has been registered in advance; and
   a biometric information value range updating unit that, when the fake body judgment unit has judged that the subject is a living body, shifts the biometric information value range such that a difference between the biometric information value that is input from the subject and a center value of the biometric information value range becomes smaller.

2. The biometric authentication device according to claim 1, wherein
   the biometric information value range updating unit that, when a difference between the biometric information that is input from the subject and the center value of the biometric information value range is larger than an update threshold value that is specified as a condition for updating the biometric information value range, shifts the biometric information value range.

3. The biometric authentication device according to claim 1, wherein
   the biometric information value range updating unit calculates an average value of difference values each of which is a difference between a biometric information value that is input from the subject and the center value of a biometric information value range, and
   when the calculated average value is larger than an update threshold value that is specified as a condition for updating the biometric information value range, the biometric information value range updating unit shifts the biometric information value range.

4. The biometric authentication device according to claim 1, wherein
   when a difference value between a biometric information value that is input from the subject and is stored in a storage unit while being associated with a date on which the subject has been judged to be a living body and the center value of a biometric information value range has gradually increased as days have elapsed, the biometric information value range updating unit shifts the biometric information value range.

5. The biometric authentication device according to claim 1, wherein
   the biometric information value range updating unit calculates a standard deviation value of difference values each of which is a difference between a biometric information value that is input from the subject and the center value of a biometric information value range, and
   when the calculated standard deviation value is smaller than an update threshold value that is specified as a condition for updating the biometric information value range, the biometric information value range updating unit shifts the biometric information value range.

6. The biometric authentication device according to claim 1, wherein
   when a difference between an end of the biometric information value range before being shifted and an end of the biometric information value range after being shifted is equal to or smaller than an update permitting threshold value that is specified as a condition for updating the biometric information value range, the biometric information value range updating unit shifts the biometric information value range.

7. The biometric authentication device according to claim 1, further comprising an authentication success/failure judgment unit that judges whether the subject is an authenticated person himself/herself, based on a comparison result obtained by comparing personal identification information of the subject and comparison-purpose personal identification information stored in advance in a storage unit, wherein
the biometric information value range updating unit shifts the biometric information value range according to a judgment result of the judging performed by the authentication success/failure judgment unit.

8. The biometric authentication device according to claim 7, wherein
when the authentication success/failure judgment unit has obtained a judgment result indicating that a biometric authentication process has successfully been performed, the biometric information value range updating unit shifts the biometric information value range.

9. The biometric authentication device according to claim 7, wherein
when a comparison score indicating a matching degree between the personal identification information of the subject and the comparison-purpose personal identification information is larger than a predetermined threshold value, the biometric information value range updating unit shifts the biometric information value range.

10. The biometric authentication device according to claim 7, wherein
the biometric information value range updating unit calculates an average value of comparison scores each of which indicates a matching degree between the comparison-purpose personal identification information and each piece of personal identification information of the subject that have been stored into the storage unit whenever a judgment result indicating that a biometric authentication process has successfully been performed has been obtained, and
when the calculated average value is larger than a predetermined threshold value, the biometric information value range updating unit shifts the biometric information value range.

11. The biometric authentication device according to claim 1, wherein
the biometric information value range updating unit shifts the biometric information value range such that the biometric information value is coincides with a center value of the shifted biometric information value range.

12. The biometric authentication device according to claim 1, wherein
the biometric information value range updating unit calculates an average value of biometric information values each of which has been stored into a storage unit whenever the subject has been judged to be a living body and shifts the biometric information value range such that the calculated average value is coincides with a center value of the updated biometric information value range.

13. The biometric authentication device according to claim 1, wherein
when a format version of the biometric information value that is input from the subject is different from a format version of a reference value used for specifying the biometric information value range, the biometric information value range updating unit updates the format version of the reference value so that the two format versions match.

14. The biometric authentication device according to claim 1, further comprising a biometric information value range registering unit that, when the fake body judgment unit has judged that the subject is a living body, judges whether the biometric information value range has been registered and, when the biometric information value range has not yet been registered, registers a new biometric information value range set such that the biometric information value is a center value of the new biometric information value range.

15. The biometric authentication device according to claim 1, further comprising an update history storage unit that stores therein, every time the biometric information value range updating unit shifts the biometric information value range, the biometric information value range before being shifted as an update history record.

16. The biometric authentication device according to claim 1, further comprising an update notifying unit that, when the biometric information value range updating unit has shifted the biometric information value range, notifies an administrator who manages the biometric authentication device that the biometric information value range has been updated.

17. A biometric authentication method comprising:
judging whether a subject is a fake body by verifying whether a biometric information value that is input from the subject is within a biometric information value range that has been registered in advance; and
shifting, when it has been judged that the subject is a living body in the judging, the biometric information value range such that a difference between the biometric information value that is input from the subject and a center value of the biometric information value range becomes smaller.

18. A non-transitory computer readable storage medium containing instructions that, when executed by a computer, causes the computer to perform:
judging whether a subject is a fake body by verifying whether a biometric information value that is input from the subject is within a biometric information value range that has been registered in advance; and
shiftinq, when it has been judged that the subject is a living body in the judging, the biometric information value range such that a difference between the biometric information value that is input from the subject and a center value of the biometric information value range becomes smaller.

* * * * *

UNITED STATES PATENT AND TRADEMARK OFFICE
CERTIFICATE OF CORRECTION

PATENT NO.         : 8,417,001 B2  
APPLICATION NO.    : 12/458671  
DATED              : April 9, 2013  
INVENTOR(S)        : Koichiro Niinuma It is certified that error appears in the above-identified patent and that said Letters Patent is hereby corrected as shown below:

In the Claims:

Column 20, Line 51, In Claim 18, delete "shiftinq," and insert -- shifting, --, therefor.

Signed and Sealed this  
Tenth Day of September, 2013

Teresa Stanek Rea  
*Acting Director of the United States Patent and Trademark Office*